United States Patent
Zhang et al.

(10) Patent No.: US 12,170,999 B2
(45) Date of Patent: Dec. 17, 2024

(54) PSFCH SENDING METHOD AND APPARATUS

(71) Applicant: Huawei Technologies Co., Ltd., Shenzhen (CN)

(72) Inventors: Jinfang Zhang, Shenzhen (CN); Hongjia Su, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 17/561,501

(22) Filed: Dec. 23, 2021

(65) Prior Publication Data
US 2022/0116934 A1    Apr. 14, 2022

Related U.S. Application Data

(63) Continuation of application No. PCT/CN2020/098085, filed on Jun. 24, 2020.

(30) Foreign Application Priority Data

Jun. 27, 2019   (CN) .......................... 201910569494.8

(51) Int. Cl.
*H04W 72/20*    (2023.01)
*H04W 4/40*    (2018.01)

(52) U.S. Cl.
CPC ............. *H04W 72/20* (2023.01); *H04W 4/40* (2018.02)

(58) Field of Classification Search
CPC ................................ H04W 72/20; H04W 4/40
(Continued)

(56) References Cited

U.S. PATENT DOCUMENTS 11,140,697 B2 *  10/2021  Hu ........................ H04L 1/1819
11,343,013 B2 *   5/2022  Nammi ................ H04L 5/0055
(Continued)

FOREIGN PATENT DOCUMENTS

CN    107231217 A    10/2017
CN    107534828 A     1/2018
(Continued)

OTHER PUBLICATIONS

Samsung, "On Sidelink Feedback Channel Format," 3GPP TSG RAN WG1 #97, Reno, USA, R1-1906947, total 6 pages, 3rd Generation Partnership Project, Valbonne, France (May 13-17, 2019).
(Continued)

*Primary Examiner* — Melvin H Pollack
(74) *Attorney, Agent, or Firm* — Leydig, Voit & Mayer, Ltd.

(57) ABSTRACT

A PSFCH sending method and an apparatus are provided, and relate to V2X, an intelligent vehicle, autonomous driving, an intelligent connected vehicle, and the like. The method may include: a first terminal apparatus receives first sidelink data from a second terminal apparatus, and determines, based on a transmission resource of the first sidelink data, a feedback resource used to send SFCI. The transmission resource of the first sidelink data and the feedback resource include N resource elements, and N is a positive integer. When X resource elements are required for sending first feedback information, and X is less than N, the first terminal apparatus sends at least one piece of SFCI to the second terminal apparatus on the feedback resource through at least one PSFCH. The SFCI includes the first feedback information, and the first feedback information indicates whether the first terminal apparatus correctly receives the first sidelink data.

18 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 11,470,598 | B2* | 10/2022 | Xu | H04W 72/20 |
| 11,490,341 | B2* | 11/2022 | Li | H04W 4/40 |
| 11,516,796 | B2* | 11/2022 | Pan | H04W 72/23 |
| 11,523,422 | B2* | 12/2022 | Golitschek Edler von Elbwart | H04L 1/1896 |
| 11,528,716 | B2* | 12/2022 | Freda | H04W 28/0252 |
| 11,641,570 | B2* | 5/2023 | Wang | H04W 76/27 370/329 |
| 11,659,564 | B2* | 5/2023 | Kwak | H04L 1/0075 370/329 |
| 11,659,592 | B2* | 5/2023 | Talarico | H04L 1/1887 370/329 |
| 11,671,973 | B2* | 6/2023 | Rudolf | H04L 5/0094 370/329 |
| 11,672,035 | B2* | 6/2023 | Jung | H04W 4/40 370/235 |
| 11,677,528 | B2* | 6/2023 | Baldemair | H04L 5/0057 370/329 |
| 11,678,368 | B2* | 6/2023 | Ansari | H04W 74/0825 370/329 |
| 11,700,106 | B2* | 7/2023 | Kimura | H04L 5/14 370/329 |
| 11,700,641 | B2* | 7/2023 | Kim | H04W 72/21 370/329 |
| 11,705,994 | B2* | 7/2023 | Yasukawa | H04L 1/1887 370/329 |
| 11,722,262 | B2* | 8/2023 | Chae | H04L 1/1664 370/329 |
| 11,729,724 | B2* | 8/2023 | Lee | H04W 52/143 370/329 |
| 11,729,755 | B2* | 8/2023 | Belleschi | H04W 72/0453 370/329 |
| 11,743,925 | B2* | 8/2023 | Wu | H04L 5/0053 370/329 |
| 11,764,922 | B2* | 9/2023 | Werner | H04L 25/024 370/329 |
| 11,770,870 | B2* | 9/2023 | Venugopal | H04B 7/088 370/330 |
| 11,778,596 | B2* | 10/2023 | Zhao | H04L 5/0042 370/330 |
| 11,784,763 | B2* | 10/2023 | Zhao | H04W 72/0453 370/329 |
| 11,785,624 | B2* | 10/2023 | Su | H04W 76/11 370/329 |
| 11,870,594 | B2* | 1/2024 | Wang | H04L 1/1896 |
| 2017/0257860 | A1 | 9/2017 | Nam et al. | |
| 2019/0044667 | A1 | 2/2019 | Guo et al. | |
| 2019/0110325 | A1 | 4/2019 | Gulati et al. | |
| 2021/0345396 | A1* | 11/2021 | Yu | H04W 72/23 |
| 2021/0400681 | A1* | 12/2021 | Wang | H04W 72/0453 |
| 2022/0030598 | A1* | 1/2022 | Li | H04W 72/0446 |
| 2022/0046628 | A1* | 2/2022 | Ji | H04L 5/0037 |
| 2022/0078757 | A1* | 3/2022 | Wang | H04W 72/02 |
| 2022/0140957 | A1* | 5/2022 | Kiilerich Pratas | H04L 5/0055 370/329 |
| 2022/0182206 | A1* | 6/2022 | Zhao | H04L 5/0055 |
| 2022/0182982 | A1* | 6/2022 | Yoshioka | H04W 4/40 |
| 2022/0217696 | A1* | 7/2022 | Zhao | H04L 5/0051 |
| 2022/0217741 | A1* | 7/2022 | Yoshioka | H04W 72/1263 |
| 2022/0232520 | A1* | 7/2022 | Yoshioka | H04W 72/0453 |
| 2022/0240209 | A1* | 7/2022 | Zhao | H04W 76/40 |
| 2022/0295517 | A1* | 9/2022 | Hahn | H04L 5/0044 |
| 2022/0321278 | A1* | 10/2022 | Yoshioka | H04L 1/1854 |
| 2022/0321306 | A1* | 10/2022 | Wang | H04L 1/1864 |
| 2022/0337347 | A1* | 10/2022 | Yu | G08G 1/094 |
| 2022/0360374 | A1* | 11/2022 | Yoshioka | H04L 1/1896 |

FOREIGN PATENT DOCUMENTS

| | | | |
|---|---|---|---|
| CN | 108282881 A | 7/2018 | |
| CN | 108322414 A | 7/2018 | |
| CN | 108631968 A | 10/2018 | |
| CN | 108633098 A | 10/2018 | |
| CN | 108809524 A | 11/2018 | |
| CN | 108880762 A | 11/2018 | |
| CN | 109075921 A | 12/2018 | |
| CN | 104662977 B | 5/2019 | |
| CN | 109788453 A | 5/2019 | |
| CN | 109792594 A | 5/2019 | |
| CN | 106560011 B | 12/2019 | |
| CN | 109644073 B | 9/2020 | |
| EP | 3340500 A1 | 6/2018 | |
| EP | 3787213 A2 * | 3/2021 | H04L 1/1812 |
| WO | 2020146513 A1 | 7/2020 | |

OTHER PUBLICATIONS

Huawei, HiSilicon, "PSFCH formats for NR V2X," 3GPP TSG RAN WG1 Meeting #96bis, Xi'an, China, R1-1905899, total 5 pages, 3rd Generation Partnership Project, Valbonne, France (Apr. 8-12, 2019).

Huawei, HiSilicon, "Sidelink physical layer structure for NR V2X," 3GPP TSG RAN WG1 Meeting #98, Prague, Czech Republic, R1-1908039, total 32 pages, 3rd Generation Partnership Project, Valbonne, France (Aug. 26-30, 2019).

* cited by examiner

PSFCH resource configuration used when m=1

PSFCH resource configuration used when m=2

PSFCH SENDING METHOD AND APPARATUS

CROSS-REFERENCE TO RELATED APPLICATIONS

This application is a continuation of International Application No. PCT/CN2020/098085, filed on Jun. 24, 2020, which claims priority to Chinese Patent Application No. 201910569494.8, filed on Jun. 27, 2019. The disclosures of the aforementioned applications are hereby incorporated by reference in their entireties.

TECHNICAL FIELD

Embodiments of this application relate to the field of communication technologies, and in particular, to a physical sidelink feedback channel (PSFCH) sending method and an apparatus.

BACKGROUND

In a vehicle to everything (V2X) communication system, sidelink communication may be performed between terminals by using a direct link (for example, sidelink (SL)). To improve reliability of sidelink communication, the 3rd generation partnership project (3GPP) defines a PSFCH for the sidelink, and the PSFCH may be used to send sidelink feedback control information (SFCI). The SFCI may include at least one piece of information fed back by a receive end to a transmit end on whether data is successfully received.

For example, the transmit end may include the data in a physical sidelink shared channel (PSSCH) and send the data to the receive end. After receiving the data sent by the transmit end, the receive end may send the SFCI to the transmit end on the PSFCH channel based on a receiving status of the data. After receiving the SFCI, the receive end may select an appropriate resource based on the SFCI to reschedule the data, to improve a data sending success rate, and further improve the reliability of sidelink communication.

However, the existing 3GPP protocol does not uniformly standardize a time-frequency resource of the PSFCH, which affects sending of the PSFCH. In addition, how to send the sidelink feedback control information on the time-frequency resource of the PSFCH is also not specified.

SUMMARY

Embodiments of this application provide a PSFCH sending method and an apparatus, to resolve a problem of sending sidelink feedback control information on a feedback resource used to send SFCI.

According to a first aspect, an embodiment of this application provides a PSFCH sending method, including: A first terminal apparatus receives first sidelink data from a second terminal apparatus, and determines, based on a transmission resource of the first sidelink data, a feedback resource used to send SFCI. The transmission resource of the first sidelink data and the feedback resource include the same quantity of resource elements, for example, N resource elements, and N is a positive integer. When X resource elements are required for sending first feedback information, and X is less than N, the first terminal apparatus sends at least one piece of SFCI to the second terminal apparatus on the feedback resource through at least one PSFCH. The SFCI includes the first feedback information, and the first feedback information is used to indicate whether the first terminal apparatus correctly receives the first sidelink data.

Based on the method according to the first aspect, the first terminal apparatus may determine, based on a transmission resource of sidelink data, a feedback resource used to transmit feedback information. When the feedback resource is greater than a resource required for sending the feedback information, at least one piece of SFCI including the first feedback information is sent to the second terminal apparatus through at least one PSFCH. In this way, not only the feedback resource is determined, but also how to send the SFCI on the determined feedback resource is specified.

In a possible design, with reference to the first aspect, that the first terminal apparatus sends at least one piece of SFCI to the second terminal apparatus on the feedback resource through at least one PSFCH includes: The first terminal apparatus sends $$\left\lfloor \frac{N}{X} \right\rfloor$$

pieces of SFCI to the second terminal apparatus on the feedback resource through one PSFCH. A resource size of the PSFCH is the same as a resource size obtained after the X resource elements included in the first feedback information are repeated for $$\left\lfloor \frac{N}{X} \right\rfloor$$

times. Based on this possible design, when the feedback resource is greater than the resource required for sending the feedback information, the sidelink feedback control information may be repeatedly transmitted on the feedback resource, to improve reliability of feedback transmission.

In a possible design, with reference to the first aspect, that the first terminal apparatus sends at least one piece of SFCI to the second terminal apparatus on the feedback resource through at least one PSFCH includes: The first terminal apparatus sends one piece of SFCI to the second terminal apparatus on the feedback resource through one PSFCH. A resource size of the PSFCH is the same as a size of the N resource elements included in the feedback resource. Based on this possible design, when the feedback resource is greater than the resource required for sending the feedback information, sequence extension may be performed on the sidelink feedback control information, and the sidelink feedback control information may be extended to a sequence whose size is the same as that of a resource included in the feedback resource, to improve the reliability of the feedback transmission.

In a possible design, with reference to the first aspect, that the first terminal apparatus sends at least one piece of SFCI to the second terminal apparatus on the feedback resource through at least one PSFCH includes: The first terminal apparatus sends one piece of SFCI to the second terminal apparatus on the feedback resource through one PSFCH. The SFCI further includes one or more of channel state information CSI and receiving terminal measured assistance information RMAI. A resource size of the PSFCH is the same as a size of the N resource elements included in the feedback resource. For example, a format of the PSFCH is a channel format obtained by encoding the SFCI, and the format of the PSFCH is a sequence whose size is the same as that of the N resource elements included in the feedback resource. Based on this possible design, when the feedback resource is greater than the resource required for sending the feedback information, if other information (for example, CSI and/or RMAI) needs to be sent to the second terminal apparatus, the first terminal apparatus may include other assistance information other than the first feedback information, in the sidelink feedback control information, perform channel coding on the sidelink feedback control information, and then send the sidelink feedback control information to the second terminal apparatus. Therefore, the second terminal apparatus can obtain more assistance information, and reliability of sending data by the second terminal apparatus is improved.

In a possible design, with reference to the first aspect, that the first terminal apparatus sends at least one piece of SFCI to the second terminal apparatus on a feedback resource through at least one PSFCH includes: The first terminal apparatus sends first SFCI to the second terminal apparatus on the feedback resource through a first PSFCH, and sends second SFCI to the second terminal apparatus through a second PSFCH. A resource size of the first PSFCH is the same as a size of the X resource elements included in the first feedback information, and a resource size of the second PSFCH is the same as a resource size obtained by subtracting the X resource elements included in the first feedback information from the N resource elements included in the feedback resource. The first SFCI includes the first feedback information, and the second SFCI includes one or more of channel state information and receiving terminal measured assistance information RMAI.

Based on this possible design, when the feedback resource is greater than the resource required for sending the feedback information, if other information (for example, CSI and/or RMAI) needs to be sent to the second terminal apparatus, the first terminal apparatus may send the first PSFCH and the second PSFCH, send the first feedback information through the first PSFCH, and send other assistance information such as the RMAI and the channel state information through the second PSFCH. In this way, not only feedback reliability can be ensured, but also channel information and the RMAI can be effectively fed back by using a remaining feedback resource. This improves reliability of sending data by a transmit end apparatus.

In a possible design, with reference to any one of the first aspect or the possible designs of the first aspect, the first sidelink data occupies an $n^{th}$ slot, where n is a natural number. The feedback resource is not earlier than an $(n+k)^{th}$ slot. For example, a start location of the feedback resource may be a start symbol in the $(n+k)^{th}$ slot, where k is a natural number. Based on this possible design, it is designed that at least k slots are spaced between a slot for sending the sidelink data and a slot for sending the feedback information, to ensure that a terminal apparatus can complete receiving of the sidelink data and prepare to send the feedback information.

In a possible design, with reference to any one of the first aspect or the possible designs of the first aspect, the method further includes: The first terminal apparatus receives indication information configured by a network device, or the first terminal apparatus obtains preconfigured indication information, or the first terminal apparatus receives indication information sent by the second terminal apparatus. The indication information is used to indicate k. That the first terminal apparatus determines a feedback resource includes: The first terminal apparatus determines, based on the indication information, a time domain resource included in the feedback resource. Based on this possible design, the first terminal apparatus may determine a time domain position of the feedback resource based on an indication of the second terminal apparatus or a preconfigured value of k, which is easy to implement.

In a possible design, with reference to any one of the first aspect or the possible designs of the first aspect, a frequency domain start location of the feedback resource is the same as a start location of a frequency domain resource occupied by the first sidelink data. Based on this possible design, the frequency domain start location of the feedback resource is designed to be the same as a frequency domain start location of the sidelink data received by the first terminal apparatus, which is easy to implement.

According to a second aspect, this application provides a terminal apparatus. The terminal apparatus may be a first terminal apparatus or a chip or a system-on-a-chip in the first terminal apparatus, or may be a functional module that is in the first terminal apparatus and that is configured to implement the method according to any one of the first aspect or the possible design of the first aspect. The terminal apparatus may implement functions performed by the first terminal apparatus in the foregoing aspect or the possible designs, and the functions may be implemented by hardware by executing corresponding software. The hardware or the software includes one or more modules corresponding to the foregoing functions. For example, the terminal apparatus includes a receiving unit, a determining unit, and a sending unit.

The receiving unit is configured to receive first sidelink data from a second terminal apparatus.

The determining unit is configured to determine, based on a transmission resource of the first sidelink data, a feedback resource used to send SFCI. The transmission resource of the first sidelink data and the feedback resource include the same quantity of resource elements, for example, N resource elements, and N is a positive integer.

The sending unit is configured to: when X resource elements are required for sending first feedback information, and X is less than N, send at least one piece of SFCI to the second terminal apparatus on the feedback resource through at least one PSFCH, where the SFCI includes the first feedback information, and the first feedback information is used to indicate whether the first terminal apparatus correctly receives the first sidelink data.

For a specific implementation of the terminal apparatus, refer to behavior functions of the first terminal apparatus in the PSFCH sending method provided in any one of the first aspect or the possible designs of the first aspect. The method according to any one of the first aspect or the possible designs of the first aspect may be correspondingly implemented by a processing unit and the sending unit included in the terminal apparatus. Details are not described herein again. Therefore, the provided terminal apparatus can achieve same beneficial effects as any one of the first aspect or the possible designs of the first aspect.

According to a third aspect, a terminal apparatus is provided. The terminal apparatus may be a first terminal apparatus or a chip or a system-on-a-chip in the first terminal apparatus. The terminal apparatus may implement functions performed by the first terminal apparatus in the foregoing aspect or the possible designs, and the functions may be implemented by hardware. For example, in a possible design, the terminal apparatus may include a processor and a communication interface. The processor receives first sidelink data from a second terminal apparatus through the communication interface, and determines, based on a transmission resource of the first sidelink data, a feedback resource used to send SFCI. The transmission resource of the first sidelink data and the feedback resource include the same quantity of resource elements, for example, N resource elements, and N is a positive integer. When X resource elements are required for sending first feedback information, and X is less than N, the communication interface sends at least one piece of SFCI to the second terminal apparatus on the feedback resource through at least one PSFCH. The SFCI includes the first feedback information, and the first feedback information is used to indicate whether the first terminal apparatus correctly receives the first sidelink data. In still another possible design, the terminal apparatus may further include a memory, and the memory is configured to store computer-executable instructions and data that are necessary for the terminal apparatus. When the terminal apparatus runs, the processor executes the computer-executable instructions stored in the memory, to enable the terminal apparatus to perform the PSFCH sending method according to any one of the first aspect or the possible designs of the first aspect.

According to a fourth aspect, a computer storage medium is provided. The computer-readable storage medium may be a readable non-volatile storage medium. The computer storage medium stores computer instructions. When the computer instructions are run on a computer, the computer is enabled to perform the PSFCH sending method according to any one of the first aspect or the possible designs of the foregoing aspect.

According to a fifth aspect, a computer program product including instructions is provided. When the computer program product runs on a computer, the computer is enabled to be capable of performing the PSFCH sending method according to any one of the first aspect or the possible designs of the foregoing aspect.

According to a sixth aspect, a terminal apparatus is provided. The terminal apparatus may be a first terminal apparatus or a chip or a system-on-a-chip in the first terminal apparatus, and the terminal apparatus includes one or more processors and one or more memories. The one or more memories are coupled to the one or more processors, the one or more memories are configured to store computer program code, and the computer program code includes computer instructions. When the one or more processors execute the computer instructions, the terminal apparatus is enabled to perform the PSFCH sending method according to any one of the first aspect or the possible designs of the first aspect.

For technical effects achieved by any one of the designs of the third aspect to the sixth aspect, refer to technical effects achieved by any one of the first aspect or the possible designs of the first aspect. Details are not described again.

According to a seventh aspect, an embodiment of this application provides a PSFCH sending method, including: A second terminal apparatus sends first sidelink data to a first terminal apparatus, and receives at least one piece of SFCI from the first terminal apparatus through at least one PSFCH. A transmission resource of the first sidelink data includes N resource elements, and N is a positive integer. First feedback information is used to indicate whether the first terminal apparatus correctly receives the first sidelink data, X resource elements are required for sending the first feedback information, and X is less than N.

Based on the method according to the seventh aspect, after sending sidelink data, and when a feedback resource is greater than a resource required for sending feedback information, the second terminal apparatus may receive at least one piece of SFCI from the first terminal apparatus through at least one PSFCH. In this way, how to transmit the SFCI on the feedback resource is specified.

In a possible design, with reference to the seventh aspect, that the second terminal apparatus receives at least one piece of SFCI from the first terminal apparatus through at least one PSFCH includes: The second terminal apparatus receives $$\left\lfloor \frac{N}{X} \right\rfloor$$

pieces of SFCI from the first terminal apparatus through one PSFCH. A resource size of the PSFCH is the same as a resource size obtained after the X resource elements included in the first feedback information are repeated for $$\left\lfloor \frac{N}{X} \right\rfloor$$

times. Based on this possible design, when the feedback resource is greater than the resource required for sending the feedback information, the second terminal apparatus may receive, on the feedback resource, repeatedly sent sidelink feedback control information, to improve reliability of feedback transmission.

In a possible design, with reference to the seventh aspect, that the second terminal apparatus receives at least one piece of SFCI from the first terminal apparatus through at least one PSFCH includes: The second terminal apparatus receives one piece of SFCI from the first terminal apparatus through one PSFCH. A resource size of the PSFCH is the same as a size of the N resource elements included in the feedback resource. Based on this possible design, when the feedback resource is greater than the resource required for sending the feedback information, sequence extension is performed on the sidelink feedback control information, and the sidelink feedback control information is extended to a sequence whose size is the same as that of a resource included in the feedback resource, to improve the reliability of the feedback transmission.

In a possible design, with reference to the seventh aspect, that the second terminal apparatus receives at least one piece of SFCI from the first terminal apparatus through at least one PSFCH includes: The second terminal apparatus receives one piece of SFCI from the first terminal apparatus through one PSFCH. The SFCI further includes one or more of channel state information CSI and receiving terminal measured assistance information RMAI. A resource size of the PSFCH is the same as a size of the N resource elements included in the feedback resource.

Based on this possible design, when the feedback resource is greater than the resource required for sending the feedback information, if other information (for example, CSI and/or RMAI) is sent by the first terminal apparatus to the second terminal apparatus, the second terminal apparatus receives other assistance information other than the first feedback information. Therefore, the second terminal apparatus can obtain more assistance information, and reliability of sending data by the second terminal apparatus is improved.

In a possible design, with reference to the seventh aspect, that the second terminal apparatus receives at least one piece of SFCI from the first terminal apparatus through at least one PSFCH includes: The second terminal apparatus receives first SFCI from the first terminal apparatus through a first PSFCH, and receives second SFCI from the first terminal apparatus through a second PSFCH. A resource size of the first PSFCH is the same as a size of the X resource elements included in the first feedback information, and a resource size of the second PSFCH is the same as a resource size obtained by subtracting the X resource elements included in the first feedback information from the N resource elements included in the feedback resource. The first SFCI includes the first feedback information, and the second SFCI includes one or more of channel state information and receiving terminal measured assistance information RMAI.

Based on this possible design, when the feedback resource is greater than the resource required for sending the feedback information, if other information (for example, CSI and/or RMAI) is sent by the first terminal apparatus to the second terminal apparatus, the second terminal apparatus may receive the first PSFCH and the second PSFCH that are sent by the first terminal apparatus, send the first feedback information through the first PSFCH, and send other assistance information such as the RMAI and the channel state information through the second PSFCH. In this way, not only feedback reliability can be ensured, but also channel information and the RMAI can be effectively fed back by using a remaining feedback resource. This improves reliability of sending data by a transmit end apparatus.

In a possible design, with reference to any one of the seventh aspect or the possible design of the seventh aspect, the first sidelink data occupies an $n^{th}$ slot, where n is a natural number. The feedback resource is not earlier than an $(n+k)^{th}$ slot, where k is a natural number. Based on this possible design, it is designed that at least k slots are spaced between a slot for sending the sidelink data and a slot for sending the feedback information, to ensure that a terminal apparatus can complete receiving of the sidelink data and prepare to send the feedback information.

In a possible design, with reference to any one of the seventh aspect or the possible designs of the seventh aspect, the method further includes: k is configured by a network device for the first terminal apparatus; or k is preconfigured on the first terminal apparatus; or k is indicated by the second terminal apparatus to the first terminal apparatus. Based on this possible design, the second terminal apparatus may indicate a value of k to the first terminal apparatus, or preconfigure the value of k on the first terminal apparatus, which is easy to implement.

In a possible design, with reference to any one of the seventh aspect or the possible designs of the seventh aspect, a frequency domain start location of the feedback resource is the same as a start location of a frequency domain resource occupied by the first sidelink data. Based on this possible design, the frequency domain start location of the feedback resource is designed to be the same as a frequency domain start location of the sidelink data received by the first terminal apparatus, which is easy to implement.

According to an eighth aspect, this application provides a terminal apparatus. The terminal apparatus may be a second terminal apparatus or a chip or a system-on-a-chip in the second terminal apparatus, or may be a functional module that is in the second terminal apparatus and that is configured to implement the method according to any one of the seventh aspect or the possible designs of the seventh aspect. The terminal apparatus may implement functions performed by the second terminal apparatus in the foregoing aspects or the possible designs, and the functions may be implemented by hardware by executing corresponding software. The hardware or the software includes one or more modules corresponding to the foregoing functions. For example, the terminal apparatus may include a sending unit and a receiving unit.

The sending unit is configured to send first sidelink data to a first terminal apparatus. A transmission resource of the first sidelink data includes N resource elements, and N is a positive integer.

The receiving unit is configured to receive at least one piece of SFCI from the first terminal apparatus through at least one PSFCH. First feedback information is used to indicate whether the first terminal apparatus correctly receives the first sidelink data. X resource elements are required for sending the first feedback information, and X is less than N.

For a specific implementation of the terminal apparatus, refer to behavior functions of the second terminal apparatus in the PSFCH sending method provided in any one of the seventh aspect or the possible designs of the seventh aspect. The method according to any one of the seventh aspect or the possible designs of the seventh aspect may be correspondingly implemented by a processing unit and the sending unit included in the terminal apparatus. Details are not described herein again. Therefore, the provided terminal apparatus can achieve same beneficial effects as any one of the seventh aspect or the possible designs of the seventh aspect.

According to a ninth aspect, a terminal apparatus is provided. The terminal apparatus may be a second terminal apparatus or a chip or a system-on-a-chip in the second terminal apparatus. The terminal apparatus may implement functions performed by the second terminal apparatus in the foregoing aspects or the possible designs, and the functions may be implemented by hardware. For example, in a possible design, the terminal apparatus may include a processor and a communication interface. The processor sends first sidelink data to a first terminal apparatus through the communication interface, and receives at least one piece of SFCI from the first terminal apparatus through at least one PSFCH. A transmission resource of the first sidelink data includes N resource elements, and N is a positive integer. First feedback information is used to indicate whether the first terminal apparatus correctly receives the first sidelink data. X resource elements are required for sending the first feedback information, and X is less than N. In still another possible design, the terminal apparatus may further include a memory, and the memory is configured to store computer-executable instructions and data that are necessary for the terminal apparatus. When the terminal apparatus runs, the processor executes the computer-executable instructions stored in the memory, to enable the terminal apparatus to perform the PSFCH sending method according to any one of the seventh aspect or the possible designs of the seventh aspect.

According to a tenth aspect, a computer storage medium is provided. The computer-readable storage medium may be a readable non-volatile storage medium. The computer storage medium stores computer instructions. When the computer instructions are run on a computer, the computer is enabled to perform the PSFCH sending method according to any one of the seventh aspect or the possible designs of the foregoing aspect.

According to an eleventh aspect, a computer program product including instructions is provided. When the computer program product runs on a computer, the computer is enabled to be capable of performing the PSFCH sending method according to any one of the seventh aspect or the possible designs of the foregoing aspect.

According to a twelfth aspect, a terminal apparatus is provided. The terminal apparatus may be a second terminal apparatus or a chip or a system-on-a-chip in the second terminal apparatus, and the terminal apparatus includes one or more processors and one or more memories. The one or more memories are coupled to the one or more processors, the one or more memories are configured to store computer program code, and the computer program code includes computer instructions. When the one or more processors execute the computer instructions, the terminal apparatus is enabled to perform the PSFCH sending method according to any one of the seventh aspect or the possible designs of the seventh aspect.

For technical effects achieved by any one of the designs of the ninth aspect to the twelfth aspect, refer to technical effects achieved by any one of the seventh aspect or the possible designs of the seventh aspect. Details are not described again.

According to a thirteenth aspect, an embodiment of this application provides a power control system. The system includes the terminal apparatus according to any one of the second aspect to the sixth aspect and the terminal apparatus according to any one of the eighth aspect to the twelfth aspect.

BRIEF DESCRIPTION OF DRAWINGS

FIG. 4a-2 is a schematic diagram of a long-format PSFCH according to an embodiment of this application;

FIG. 4b-1 is a schematic diagram of a PSFCH resource configuration according to an embodiment of this application;

FIG. 4b-2 is a schematic diagram of a PSFCH resource configuration according to an embodiment of this application;

FIG. 6a-1 is a schematic diagram of sending SFCI according to an embodiment of this application;

FIG. 6a-2 is a schematic diagram of sending SFCI according to an embodiment of this application;

FIG. 6d-1 is a schematic diagram of sending SFCI according to an embodiment of this application;

FIG. 6d-2 is a schematic diagram of sending SFCI according to an embodiment of this application;

DESCRIPTION OF EMBODIMENTS

The following describes implementations of embodiments of this application in detail with reference to accompanying drawings in this specification.

Figure 1A:
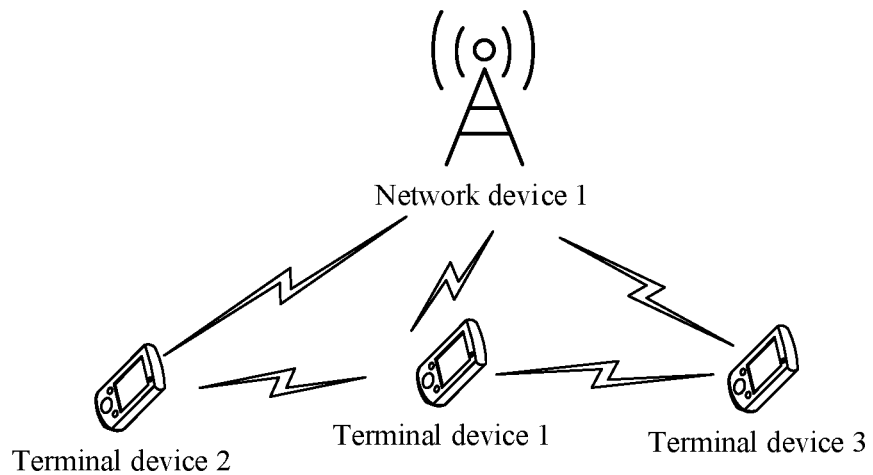
FIG. 1a is a schematic composition diagram of a communication system according to an embodiment of this application.

A PSFCH sending method provided in the embodiments of this application may be applied to any communication system supporting sidelink communication. The communication system may be a 3rd generation partnership project (3GPP) communication system, for example, may be a long term evolution (LTE) system, may be a 5th generation (5G) mobile communication system, a new radio (NR) system, an NR-vehicle-to-everything communication (V2X) system, or another next generation communication system, or may be a non-3GPP communication system. This is not limited. FIG. 1a is used as an example below to describe the method provided in the embodiments of this application.

FIG. 1a is a schematic diagram of a communication system according to an embodiment of this application. As shown in FIG. 1a, the communication system may include a network device and a terminal device. The terminal device may be located within a coverage area of a cell, or may be located outside the coverage area of the cell. The terminal device may communicate with the network device through a Uu interface, or may perform sidelink communication with another terminal device through a sidelink (or a PC5 interface).

The network device in FIG. 1a may be any device with a wireless transceiver function, and is mainly configured to implement functions such as a radio physical control function, resource scheduling and radio resource management, radio access control, and mobility management. Specifically, the network device may be an access network (AN)/radio access network (RAN) device, or may be a device including a plurality of 5G-AN/5G-RAN nodes, or may be a NodeB (NB), an evolved NodeB (eNB), a next generation NodeB (gNB), a transmission reception point (TRP), a transmission point (TP), a road side unit (RSU), any node of some other access nodes, or the like. This is not limited.

The terminal device (terminal equipment) in FIG. 1a may be referred to as a terminal, user equipment (UE), a mobile station (MS), a mobile terminal (MT), or the like. Specifically, the terminal device in FIG. 1a may be a mobile phone, a tablet computer, or a computer with a wireless transceiver function. The terminal may also be a virtual reality (VR) terminal, an augmented reality (AR) terminal, a wireless terminal in industrial control, a wireless terminal in autonomous driving, a wireless terminal in telemedicine, a wireless terminal in a smart grid, a wireless terminal in a smart city, a wireless terminal in a smart home, a vehicle-mounted terminal, a vehicle with a V2V communication capability, a roadside unit (RSU), or the like. This is not limited.

It should be noted that FIG. 1a is merely a figure used as an example, a quantity of devices included in FIG. 1a is not limited. In addition to the device shown in FIG. 1a, the communication architecture may further include another device. In addition, a name of each device in FIG. 1a is not limited. In addition to the name shown in FIG. 1a, each device may have another name. This is not limited.

In the communication system shown in FIG. 1a, there are the following two resource allocation methods: 1. Network device scheduling mode (which is referred to as LTE-V2X mode3 in LTE-V2X, or referred to as NR-V2X mode1 in NR-V2X). To be specific, the network device indicates a transmission resource to the terminal device. 2. Terminal apparatus self-scheduling mode (which is referred to as LTE-V2X mode4 in LTE-V2X, or referred to as NR-V2X mode2 in NR-V2X). To be specific, the network device allocates, to the terminal device, a resource pool including a large quantity of resources, and a plurality of terminal devices may select, from the resource pool in a self-perceived scheduling or contention manner, transmission resources required by the plurality of terminal devices. For example, in a network scheduling mode, the network device may notify the terminal device of a transmission resource of a data channel by using downlink control information (DCI) carried on a physical downlink control channel (PDCCH). After obtaining the transmission resource, the terminal device may send sidelink control information and sidelink data to the peer end, through a physical sidelink control channel (PSCCH) and a physical sidelink shared channel (PSSCH) on the obtained transmission resource.

Figure 1B:
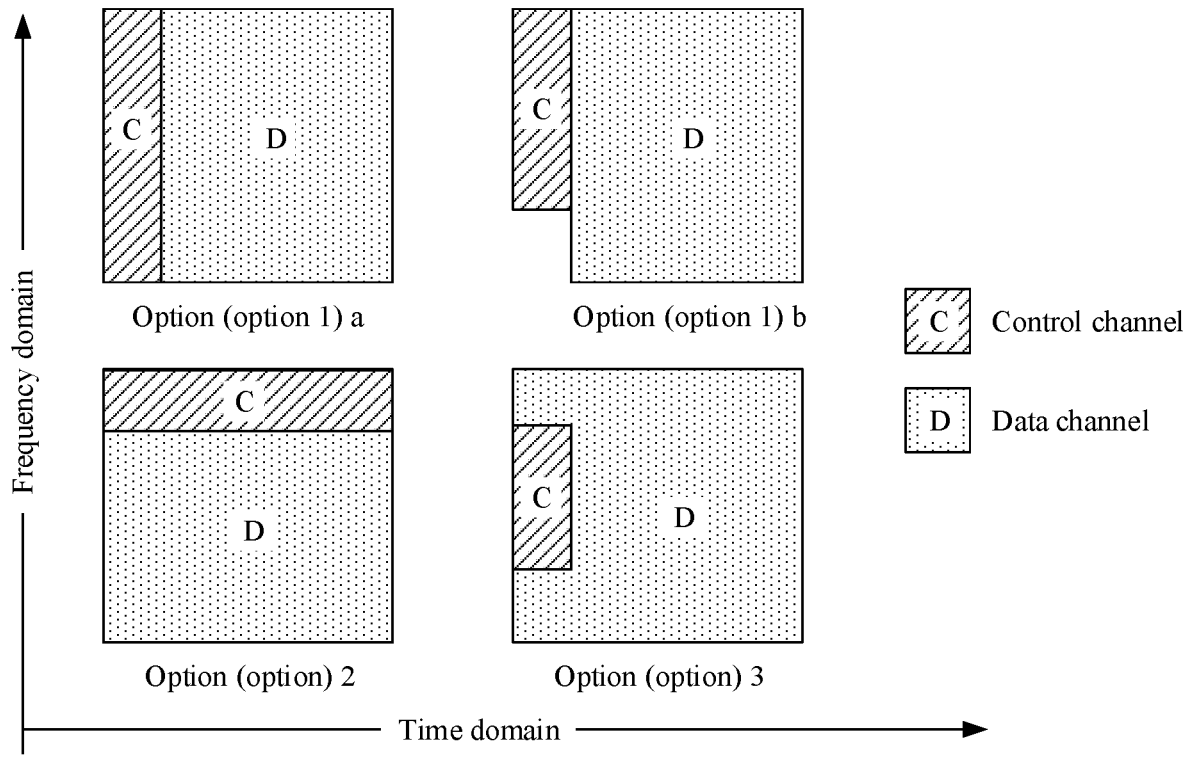
FIG. 1b is a schematic diagram of multiplexing relationships between a PSSCH and a PSCCH.

In this embodiment of this application, the PSSCH and the PSCCH may be multiplexed together and sent to the terminal device. For example, four frame structures shown in FIG. 1b may be used to send the data channel and the control channel. As shown in FIG. 1b, the four frame structures are respectively: Option 1a: The PSCCH and the PSSCH are in same frequency domain and do not overlap in time domain. Option 1b: The PSCCH and the PSSCH overlap in frequency domain but do not overlap in time domain. Option 2: The PSCCH and the PSSCH are in same time domain and do not overlap in frequency domain. Option 3: A part of the PSCCH and a part of the PSSCH are in same time domain and do not overlap in frequency domain, and a remaining part of the PSCCH and a remaining part of the PSSCH overlap in frequency domain but do not overlap in time domain.

Figure 2:
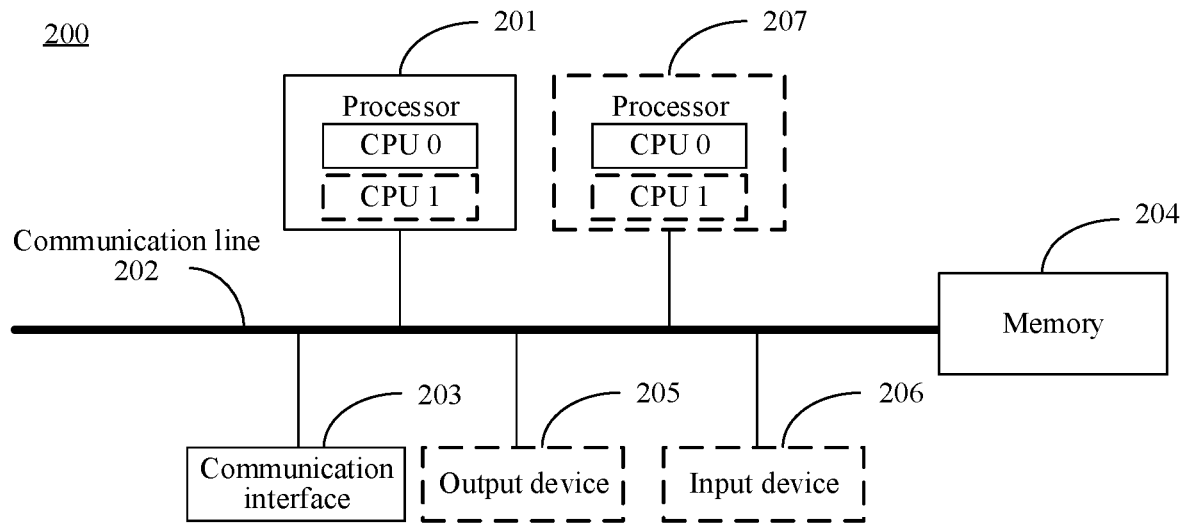
FIG. 2 is a schematic composition diagram of a terminal apparatus according to an embodiment of this application.

During specific implementation, each terminal device shown in FIG. 1a may use a composition structure shown in FIG. 2 or include components shown in FIG. 2. FIG. 2 is a schematic composition diagram of a terminal apparatus 200 according to an embodiment of this application. The terminal apparatus 200 may be a terminal device or a chip or a system-on-a-chip in the terminal device. As shown in FIG. 2, the terminal apparatus 200 includes a processor 201, a communication line 202, and a communication interface 203.

Further, the terminal apparatus 200 may further include a memory 204. The processor 201, the memory 204, and the communication interface 203 may be connected to each other through the communication line 202.

The processor 201 is a central processing unit (CPU), a general-purpose processor network processor (NP), a digital signal processor (DSP), a microprocessor, a microcontroller, a programmable logic device (PLD), or any combination thereof. Alternatively, the processor 201 may be any other apparatus having a processing function, for example, a circuit, a component, or a software module. This is not limited.

The communication line 202 is configured to transmit information between components included in the terminal apparatus 200.

The communication interface 203 is configured to communicate with another device or another communication network. The another communication network may be Ethernet, a radio access network (RAN), a wireless local area network (WLAN), or the like. The communication interface 203 may be a module, a circuit, a transceiver, or any apparatus that can implement communication.

The memory 204 is configured to store instructions. The instructions may be a computer program.

The memory 204 may be a read-only memory (ROM) or another type of static storage device that can store static information and/or instructions, or may be a random access memory (RAM) or another type of dynamic storage device that can store information and/or instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or the like. This is not limited.

It should be noted that the memory 204 may exist independently of the processor 201, or may be integrated with the processor 201. The memory 204 may be configured to store instructions, program code, some data, or the like. The memory 204 may be located in the terminal apparatus 200, or may be located outside the terminal apparatus 200. This is not limited.

The processor 201 is configured to execute the instructions stored in the memory 204, to implement the PSFCH sending method provided in the following embodiments of this application.

In an example, the processor 201 may include one or more CPUs, for example, a CPU 0 and a CPU 1 in FIG. 2.

In an optional implementation, the terminal apparatus 200 includes a plurality of processors. For example, in addition to the processor 201 in FIG. 2, the terminal apparatus 200 may further include a processor 207.

In an optional implementation, the terminal apparatus 200 further includes an output device 205 and an input device 206. For example, the input device 206 is a device, for example, a keyboard, a mouse, a microphone, or a joystick, and the output device 205 is a device, for example, a display screen or a speaker.

It should be noted that the terminal apparatus 200 may be a desktop computer, a laptop computer, a network server, a mobile phone, a tablet computer, a wireless terminal, an embedded device, a chip system, or a device having a structure similar to that shown in FIG. 2. In addition, the composition structure shown in FIG. 2 does not constitute a limitation on the terminal apparatus. In addition to the components shown in FIG. 2, the terminal apparatus may include more or fewer components than those shown in the figure, or combine some components, or have different component arrangements.

In this embodiment of this application, the chip system may include a chip, or may include a chip and another discrete component.

In addition, mutual reference may be made to actions, terms, and the like in the embodiments of this application. This is not limited. In the embodiments of this application, names of messages exchanged between devices, names of parameters in the messages, or the like are merely examples. In specific implementation, other names may alternatively be used. This is not limited.

The following describes the PSFCH sending method provided in the embodiments of this application by using the architecture shown in FIG. Ta as an example. The terminal apparatus in the following embodiments may have the components shown in FIG. 2.

Figure 3:
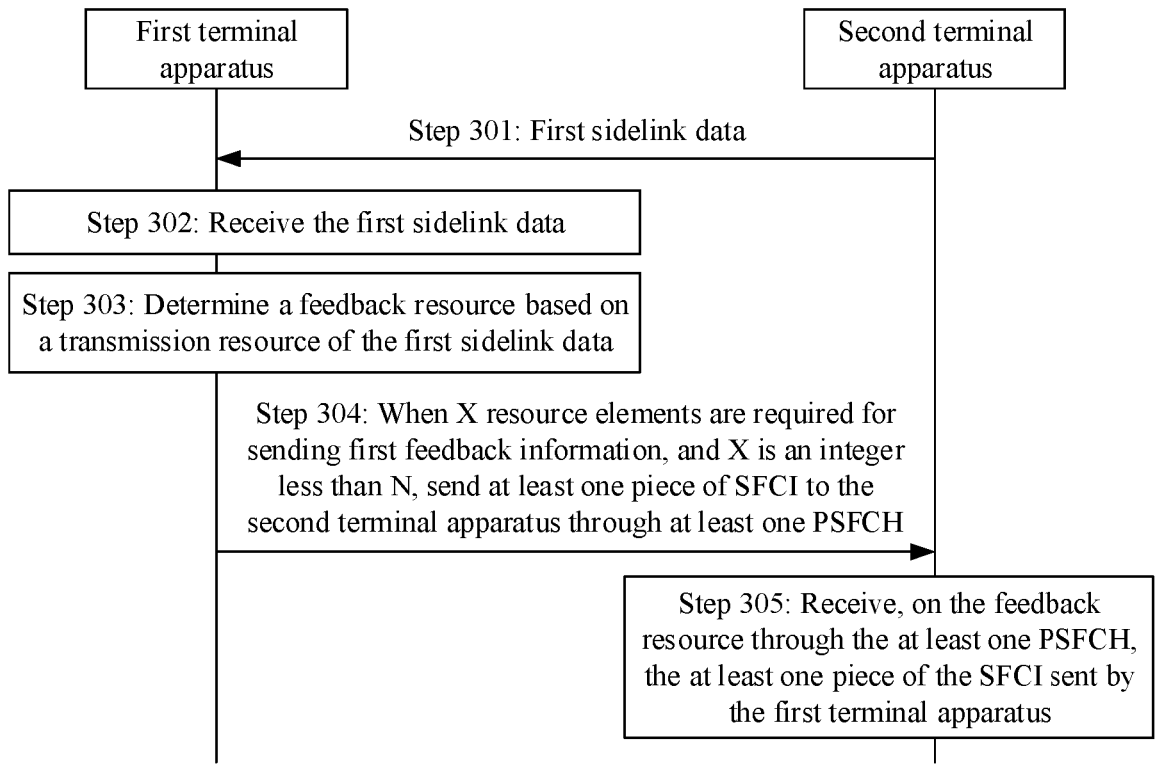
FIG. 3 is a flowchart of a PSFCH sending method according to an embodiment of this application.

FIG. 3 shows a PSFCH sending method according to an embodiment of this application. As shown in FIG. 3, the method may include the following steps.

Step 301: A second terminal apparatus sends first sidelink data to a first terminal apparatus.

The second terminal apparatus may be any terminal device in FIG. Ta, and the first terminal apparatus may be any terminal device that performs sidelink communication with the second terminal apparatus. For example, the second terminal apparatus may be the terminal 1 in FIG. T a, and the first terminal apparatus may be the terminal 2 in FIG. T a.

For example, the second terminal apparatus may send the first sidelink data to the first terminal apparatus on a transmission resource of the first sidelink data through a physical sidelink shared channel (PSSCH). Alternatively, it may be described as that the second terminal device includes the first sidelink data in the PSSCH, and sends the PSSCH to the first terminal apparatus on the transmission resource of the first sidelink data.

The transmission resource of the first sidelink data may include N resource elements, and N is a positive integer. In this embodiment of this application, a resource element may be a sub-channel, a physical resource block (PRB), or a resource at another division granularity. This is not limited. Further optionally, the transmission resource of the first sidelink data further includes a time domain resource, and a length of the time domain resource is not limited. The length of the time domain resource may be one or more slots, or may be a plurality of consecutive symbols in one slot, a plurality of consecutive symbols in a plurality of slots, or the like. This is not limited. For example, the first sidelink data occupies one sub-channel in frequency domain, and occupies a symbol 0 to a symbol 12 in a slot 1 in time domain.

One sub-channel may include a plurality of PRBs. For example, one sub-channel may include four PRBs.

For example, the transmission resource of the first sidelink data may be configured by a network device for the second terminal apparatus, or may be independently selected by the second terminal apparatus. This is not limited. In addition, the transmission resource of the first sidelink data may be indicated to the first terminal apparatus by using sidelink control information (SCI) carried on the PSCCH. Therefore, the first terminal apparatus may receive the first sidelink data on the transmission resource of the first sidelink data, to improve accuracy of receiving sidelink data. The PSCCH and the PSSCH may be frequency division multiplexed or time division multiplexed on a time-frequency resource. Multiplexing relationships between the PSCCH and the PSSCH are shown in FIG. Tb, and details are not described again.

Step 302: The first terminal apparatus receives the first sidelink data.

For example, the first terminal apparatus may receive the first sidelink data on the transmission resource of the first sidelink data through the PSSCH. Alternatively, this may be described as that the first terminal apparatus receives, on the transmission resource of the first sidelink data, the PSSCH that carries the first sidelink data.

Step 303: The first terminal apparatus determines a feedback resource based on the transmission resource of the first sidelink data.

The feedback resource may be used to transmit sidelink feedback control information (SFCI). The feedback resource may use a same frequency domain resource as the transmission resource of the first sidelink data, and may include N resource elements. For example, the feedback resource may include N sub-channels or N PRBs. Alternatively, the feedback resource may include Y resource elements, where Y is less than N. That is, a quantity of resource elements included in the feedback resource is less than a quantity of resource elements included in the transmission resource of the first sidelink data. In this embodiment of this application, an example in which the feedback resource includes N resource elements is used for description. When the feedback resource includes Y resource elements, a PSFCH may alternatively be sent by using the method provided in the embodiments of this application. This is not limited.

It should be noted that, in the embodiments of this application, a unit of a resource element included in the feedback resource may be less than or equal to a unit of a resource element included in the transmission resource of the first sidelink data. For example, when the feedback resource of the first sidelink data includes N sub-channels, the feedback resource may include N sub-channels, or may include N PRBs. When the feedback resource of the first sidelink data includes N PRBs, the feedback resource may include N PRBs.

The feedback resource may be a long-format resource, or may be a short-format resource. "Long-format" may mean that the feedback resource occupies all available symbols in one slot, and "short-format" may mean that the feedback resource occupies one or two symbols in one slot. For example, the last one or two symbols in one slot may be occupied.

A frequency domain start location of the feedback resource may be the same as or different from a frequency domain start location of the transmission resource of the first sidelink data. A time domain position of the feedback resource may be the same as or different from a time domain position of the transmission resource of the first sidelink data.

In a possible design, if the first sidelink data occupies an $n^{th}$ slot, and n is a natural number, the feedback resource is not earlier than an $(n+k)^{th}$ slot, where k is a natural number. That is, the feedback resource and the transmission resource of the first sidelink data are spaced by at least k slots. For example, the feedback resource may occupy the last one or two symbols in the $(n+k)^{th}$ slot, or may occupy all available symbols in the $(n+k)^{th}$ slot, or the feedback resource may occupy one or two symbols in an $(n+k+1)^{th}$ slot. This is not limited.

k is related to a PSSCH demodulation processing capability of the first terminal apparatus. A stronger PSSCH demodulation processing capability is, a smaller k is. A weaker PSSCH demodulation processing capability is, a larger k is. For example, the first terminal apparatus may obtain k by using the following method: The first terminal apparatus receives indication information that is configured by the network device and that is used to indicate k, or the first terminal apparatus obtains preconfigured indication information used to indicate k, or the first terminal apparatus receives indication information that is sent by the second terminal apparatus and that is used to indicate k. The first terminal apparatus determines, based on the indication information, that the feedback resource is not earlier than the $(n+k)^{th}$ slot.

In still another possible design, a slot occupied by the feedback resource is the same as a slot occupied by the transmission resource of the first sidelink data.

The feedback resource may be configured to be periodic. For example, one feedback resource is configured in every m slots, where m is a positive integer, and a value of m may be 1 or 2. This is not limited.

Specifically, for several possible designs of the feedback resource, refer to the description in a first embodiment below of the method shown in FIG. 3.

Step 304: When X resource elements are required for sending first feedback information, and X is an integer less than N, the first terminal apparatus sends at least one piece of SFCI to the second terminal apparatus on the feedback resource through at least one PSFCH.

The first feedback information may be used to indicate whether the first terminal apparatus correctly receives the first sidelink data. The first feedback information may be an acknowledgement (ACK) or a negative acknowledgement (NACK). For example, the first terminal apparatus receives and decodes the first sidelink data, and determines, based on whether decoding succeeds, whether to feed back an ACK or a NACK. When decoding of the first sidelink data succeeds, an ACK is fed back. Otherwise, when decoding of the first sidelink data does not succeed (or fails), a NACK is fed back. It should be noted that, in a NACK-only feedback technology, no information is fed back when decoding of the first sidelink data succeeds, and a NACK is fed back when decoding of the first sidelink data fails.

The at least one PSFCH may include one or more PSFCHs, for example, may include a first PSFCH and a second PSFCH. The at least one piece of SFCI may include one or more pieces of SFCI, for example, may include first SFCI and second SFCI. In this embodiment of this application, one or more pieces of SFCI may be sent through one PSFCH. This is not limited.

The SFCI is sidelink feedback control information. In this embodiment of this application, the SFCI includes at least the first feedback information. When a resource element required for sending the first feedback information is less than a resource element included in the feedback resource, that is, when the feedback resource has an idle spectrum resource in addition to a resource used for sending the first feedback information, and if there is other assistance information, for example, resource channel state information (CSI) and/or receiving terminal measured assistance information (receiver UE measured assistance information, RMAI), the SFCI may further include the assistance information.

The CSI may be used to indicate channel quality between the first terminal apparatus and the second terminal apparatus. The RMAI may include one or more of the following information: resource reservation information obtained through measurement, interference information on a sub-channel or a resource block, available resource information, and reference signal received power. This is not limited.

For example, before performing step 304, the first terminal apparatus may determine whether a resource required for sending the first feedback information is less than the feedback resource. If the first terminal apparatus determines that the resource required for sending the first feedback information is less than the determined feedback resource, it indicates that the feedback resource has an idle spectrum resource in addition to the resource used for sending the first feedback information, and the first terminal apparatus may determine whether other assistance information needs to be fed back. If other assistance information needs to be fed back, the first terminal apparatus may perform step 304, so that the PSFCH sent by the first terminal apparatus occupies all feedback resources as much as possible. This improves the utilization of a sidelink spectrum resource. If the first terminal apparatus determines that the resource required for sending the first feedback information is equal to the determined feedback resource, the first terminal apparatus directly sends the first feedback information on the feedback resource. For example, the first terminal apparatus sends the SFCI including the first feedback information to the second terminal apparatus through a PSFCH. The PSFCH occupies all resource elements included in the feedback resource.

For example, it is assumed that SFCI carrying feedback information occupies 10 PRBs, a PSSCH occupies 5 sub-channels, a bandwidth of each sub-channel is configured to 4 PRBs, a feedback resource determined based on the PSSCH also includes 5 sub-channels, and the feedback information occupies 10 PRBs. If the feedback information is transmitted on the feedback resource by using the PSFCH, the PSFCH occupies only 10 PRBs on the feedback resource, and there are remaining 20−10=10 PRBs in the feedback resource. In this case, the first terminal apparatus may reserve the remaining 10 PRBs not to be used to transmit the feedback information, or may use the remaining 10 PRBs to repeatedly transmit the feedback information or transmit other information such as CSI or RMAI, if the other information exists.

Specifically, for several possible implementations in which the first terminal apparatus sends the at least one piece of SFCI to the second terminal apparatus on the feedback resource through the at least one PSFCH, refer to a second embodiment of the method shown in FIG. 3 to a fifth embodiment below of the method shown in FIG. 3.

Step 305: The second terminal apparatus receives, on the feedback resource through the at least one PSFCH, the at least one piece of SFCI sent by the first terminal apparatus.

As described above, a correspondence exists between the feedback resource (or referred to as a feedback channel resource) and a resource used to transmit a data channel carrying sidelink data (a data channel resource for short). For example, a frequency domain resource element of the feedback channel resource and a frequency domain resource element of the data channel resource are the same. The feedback channel resource and the data channel resource are spaced by n+a slots. n is a slot corresponding to the data channel resource, a is a natural number greater than or equal to k, and a is a slot corresponding to the feedback resource, and the like. The second terminal apparatus may determine the feedback channel resource based on the correspondence, and may receive, on the determined feedback channel resource, through the at least one PSFCH, the at least one piece of SFCI sent by the first terminal apparatus.

Further, after receiving the at least one piece of SFCI, the second terminal apparatus may perform data retransmission, new data transmission, or the like, based on the first feedback information sent by the first terminal apparatus and one or more of the following information: the channel state information and the RMAI.

Based on the method shown in FIG. 3, the first terminal apparatus may determine, based on the transmission resource of the first sidelink data, the feedback resource used to transmit the first feedback information, and when the feedback resource is greater than the resource required for sending the first feedback information, the first terminal apparatus sends the at least one piece of SFCI including the first feedback information to the second terminal apparatus through the at least one PSFCH. In this way, the feedback resource used for sending the sidelink feedback control information is determined, and a problem of sending the SFCI on the determined feedback resource is resolved.

Figures 1, 4A:
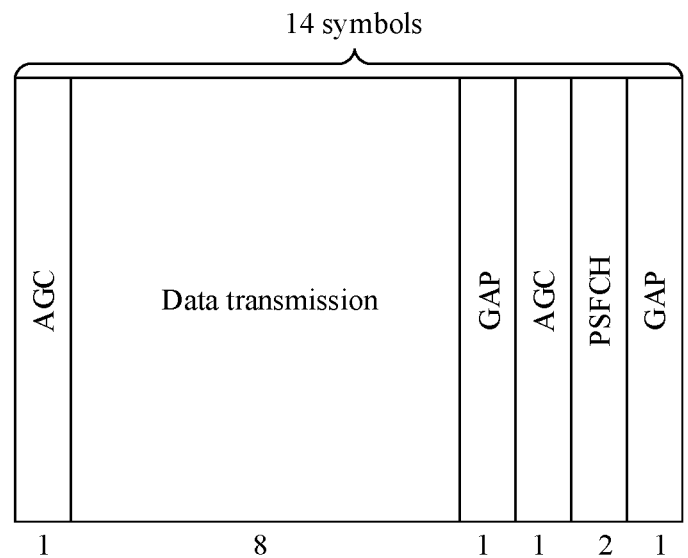
FIG. 4a-1 is a schematic diagram of a short-format PSFCH according to an embodiment of this application.
Figures 2, 4A:
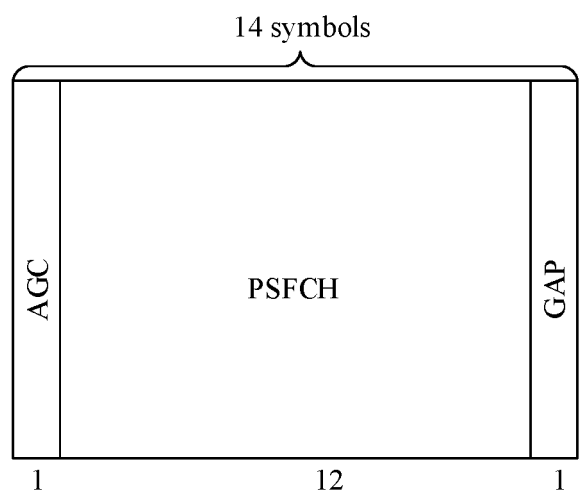

In the first embodiment of the method shown in FIG. 3, the PSFCH may use a short format and a long format. The short format occupies the last several (1 or 2) symbols of a slot on a time domain resource. The long format occupies all available symbols of a slot on a time domain resource. With reference to FIG. 4a-1 and FIG. 4a-2, a format of the PSFCH is described below by using an example in which one slot includes 14 symbols.

FIG. 4a-1 shows an implementation of a short-format PSFCH. As shown in FIG. 4a-1, the first symbol of a slot is used for automatic gain control (AGC), the second symbol to the ninth symbol are used for data transmission, the tenth symbol is used as a guard gap used for transition between receiving and sending, the eleventh symbol is used to receive AGC of feedback information, the twelfth symbol and the thirteenth symbol are used for PSFCH transmission, and the fourteenth symbol is used as a guard gap used for transition between receiving and sending.

FIG. 4a-2 shows an implementation of a long-format PSFCH. As shown in FIG. 4a-2, the first symbol in a slot is used for AGC, the second symbol to the thirteenth symbol are used for PSFCH transmission, and the fourteenth symbol is used as a guard gap used for transition between receiving and sending.

It should be noted that only one possible implementation is provided herein. A quantity of symbols occupied by a format of the PSFCH may be configured differently according to different symbol configurations in slots. For example, a short PSFCH format may occupy one symbol, and a long PSFCH format may occupy 11 symbols in an extended cyclic prefix (ECP) slot. Details are not described herein.

In this embodiment of this application, the feedback resource may be further described as a PSFCH resource. The PSFCH resource may be configured to be periodic, and a period is m. For example, when m=1, it indicates that one PSFCH resource is configured for each slot, and when m=2, it indicates that one PSFCH resource is configured for every two slots.

Figures 1, 4B:
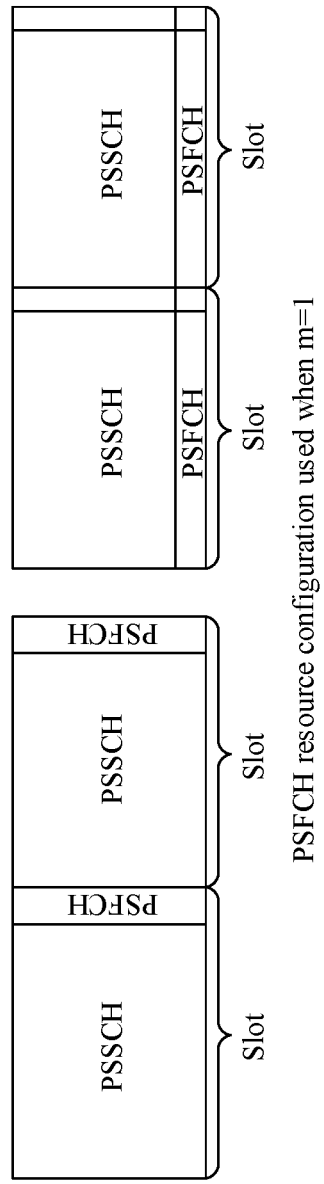
Figures 2, 4B:
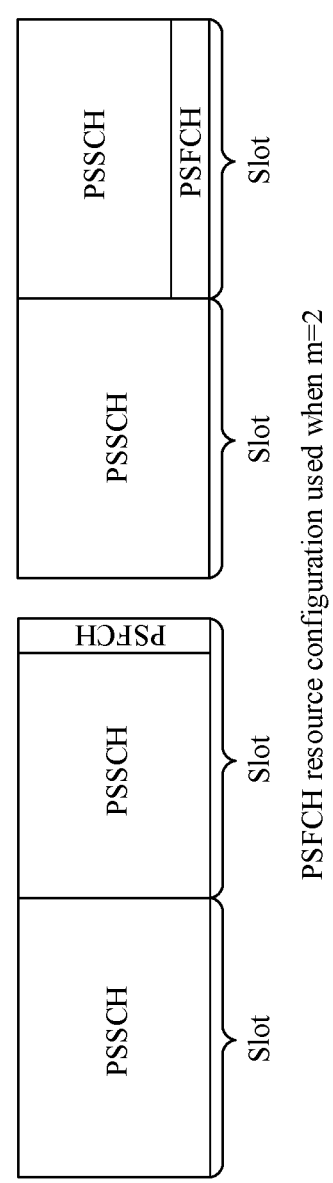

The left side of FIG. 4b-1 is a schematic diagram of a resource configuration of a short-format PSFCH when m=1, and the right side of FIG. 4b-1 is a schematic diagram of a resource configuration of a long-format PSFCH when m=1. AGC and GAP symbols are not given. As shown in FIG. 4b-1, one PSFCH resource is configured in each slot. The PSFCH in the figure on the left of FIG. 4b-1 occupies two symbols, and the PSFCH in the figure on the right of FIG. 4b-1 may occupy one slot. The left side of FIG. 4b-2 is a schematic diagram of a resource configuration of a short-format PSFCH when m=2, and the right side of FIG. 4b-2 is a schematic diagram of a resource configuration of a long-format PSFCH when m=2. AGC and GAP symbols are not given. As shown in FIG. 4b-2, one PSFCH resource is configured in every two slots. The PSFCH in the figure on the left of FIG. 4b-2 occupies two symbols, and the PSFCH in the figure on the right of FIG. 4b-2 may occupy one slot.

When m is greater than or equal to 2, a minimum slot gap required between sending of the feedback information and sending of the sidelink data may be determined based on processing capability of a communication device, to ensure that the communication device can complete data receiving and prepare to send the feedback information. For example, a minimum slot gap k may be defined as 1, that is, a corresponding PSFCH is fed back in a slot that is at least one slot after a PSSCH sending slot. If the PSSCH sending slot is n, PSFCH feedback information is sent in at least a slot n+1. If no feedback resource is configured in the slot n+1, feedback is performed in the first slot that is after the slot n+1 and that is configured with the feedback resource.

Figure 5A:
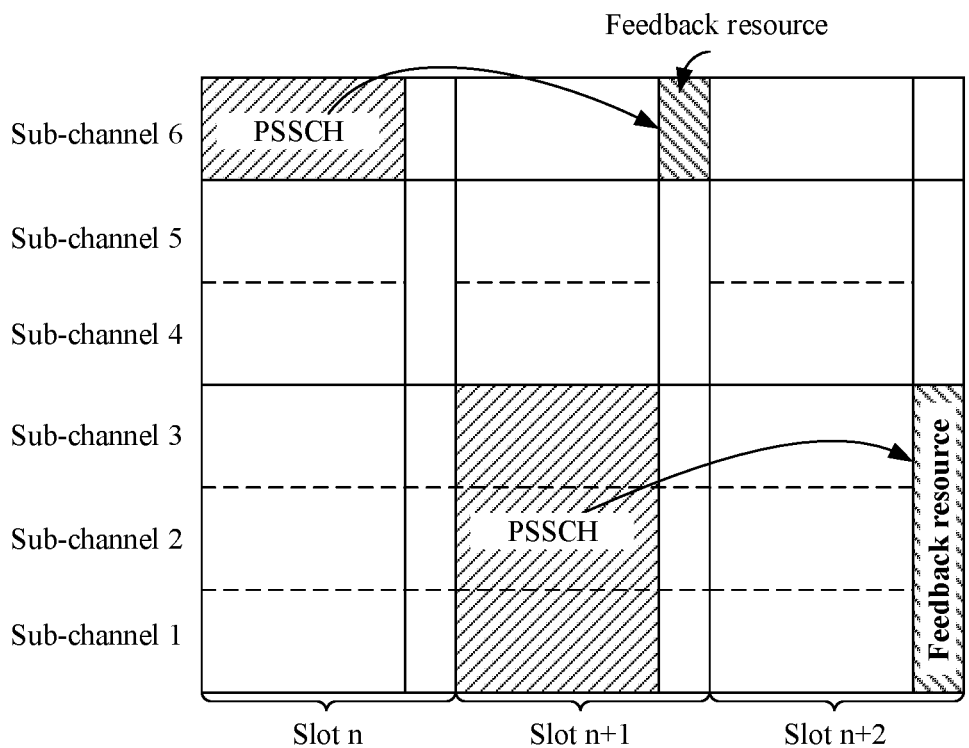
FIG. 5a is a schematic diagram of a feedback resource according to an embodiment of this application.
Figure 5B:
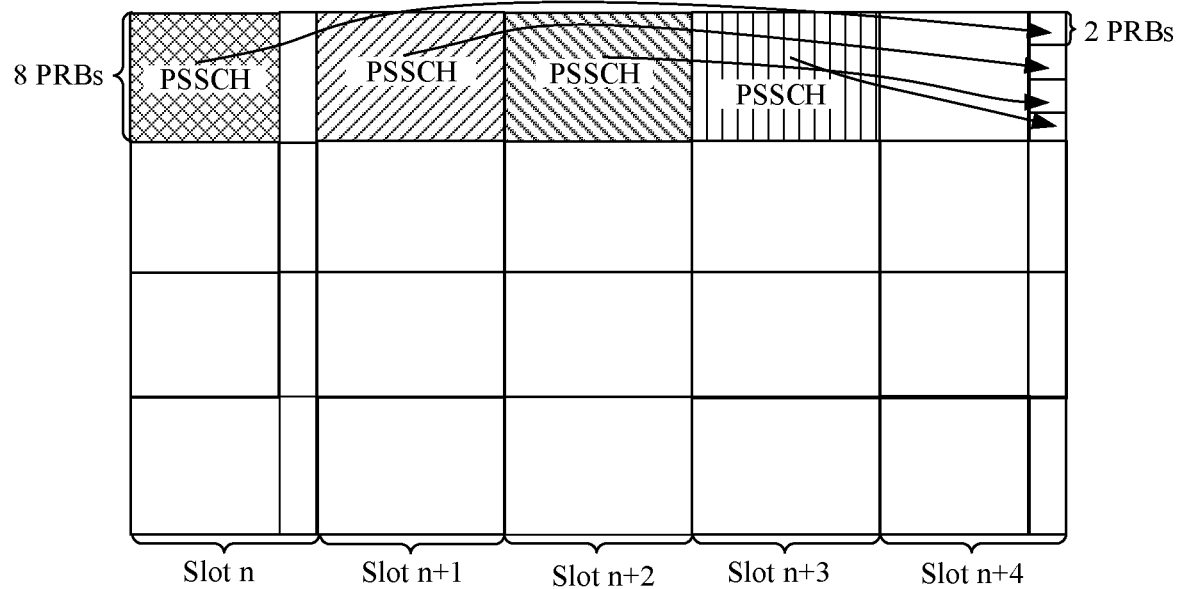
FIG. 5b is a schematic diagram of a feedback resource according to an embodiment of this application.

In terms of frequency domain, a correspondence exists between a frequency domain resource of the PSFCH and a frequency domain resource of the PSSCH. In the short-format PSFCH, in an implementation, a start sub-channel index of a frequency domain resource occupied by the PSFCH is the same as a start index of a sub-channel occupied by the PSSCH, and a quantity of sub-channels of the frequency domain resource occupied by the PSFCH is less than or equal to a quantity of sub-channels occupied by the PSSCH. As shown in FIG. 5a, the quantity of sub-channels of the frequency domain resource occupied by the PSFCH is equal to the quantity of sub-channels occupied by the PSSCH, or the quantity of sub-channels of the frequency domain resource occupied by the PSFCH may be less than the quantity of sub-channels occupied by the PSSCH. For example, the PSFCH occupies one sub-channel. The PSFCH feedback channel for the PSSCH of m>1 different slots may be code division multiplexed. For example, if m=3, 12 codewords may be multiplexed, respectively corresponding to m0 to m11. The codewords m0 to m3 may be used for a PSCCH sent in the first slot. The codewords m4 to m7 may be used for a PSCCH sent in the second slot, and the codewords m8 to m11 may be used for a PSCCH sent in the third slot. In another implementation, a frequency domain bandwidth corresponding to the feedback channel resource is divided into m*N, where N is a quantity of sub-channels included in a resource pool. As shown in FIG. 5b, $m=4$, N=4, and each sub-channel includes eight PRBs. In this case, there are 4*8=32 PRBs in the resource pool, and data transmission of a maximum of 4*4=16 PSSCHs needs to be fed back. In this case, each PSSCH can correspond to two PRBs. As shown in FIG. 5b, $k=1$, a start index and a sub-channel index of a feedback channel frequency domain resource are the same, and different slots correspond to two different PRBs. For example, a location of a feedback channel frequency domain resource corresponding to a data channel transmitted on the first sub-channel in an $n^{th}$ slot is two PRBs whose offsets are 0. A location of a feedback channel frequency domain resource corresponding to a data channel transmitted on the first sub-channel in an $(n+1)^{th}$ slot is two PRBs whose offsets are 2. Correspondingly, a location of a feedback channel frequency domain resource corresponding to a data channel transmitted on the first sub-channel in an $(n+2)^{th}$ slot is two PRBs whose offsets are 4. A location of a feedback channel frequency domain resource corresponding to a data channel transmitted on the first sub-channel in an $(n+3)^{th}$ slot is two PRBs whose offsets are 2. In FIG. 5b, feedback channel frequency domain resources corresponding to different sub-channels may be arranged in a sequence of slots, or may be arranged in a sequence of sub-channels, and details are not described herein.

Figure 5C:
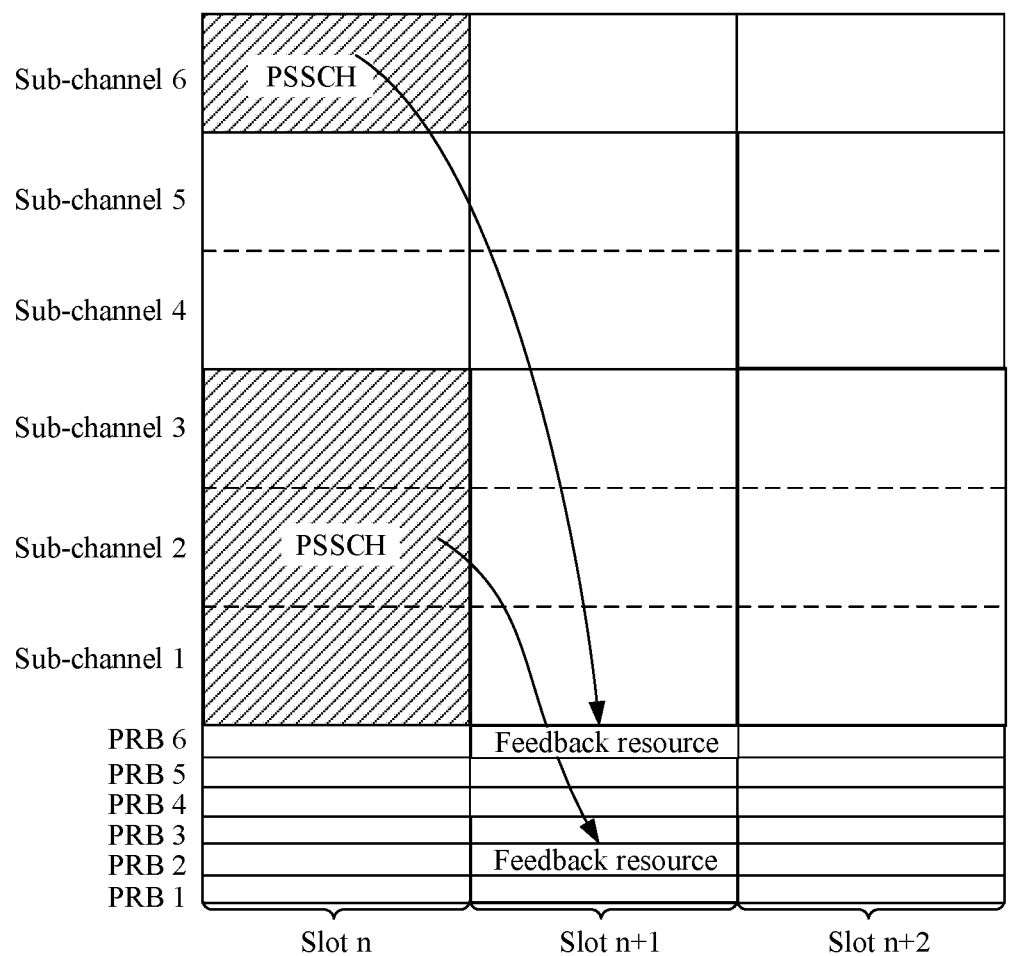
FIG. 5c is a schematic diagram of a feedback resource according to an embodiment of this application.

In the long-format PSFCH, a PSFCH frequency domain resource granularity may be designed to be different from that of a sub-channel of a data channel. For example, the PSFCH may use one PRB as a granularity. A resource of the PSFCH in the resource pool is defined as (start_PRB, no_PRB). start_PRB may be a start PRB or the last PRB in the resource pool. no_PRB is the same as a quantity of subchannels, that is, occupies a quantity of PRBs that start from start_PRB and that are corresponding to the quantity of sub-channels in the resource pool. As shown in FIG. 5c, a resource pool has six sub-channels, and six PRBs are reserved in a frequency domain start location of the resource pool for PSFCH feedback. A start PRB index of a frequency domain resource occupied by the PSFCH corresponding to each PSSCH corresponds to a start index of a sub-channel occupied by the PSSCH, and a quantity of PRBs of the frequency domain resource occupied by the PSFCH is less than or equal to a quantity of sub-channels occupied by the PSSCH. FIG. 5c shows a correspondence between a long-format PSFCH and a time-frequency resource of a corresponding PSSCH. As shown in the figure, the PSSCH occupies sub-channels 1 to 3, and a frequency domain resource of a corresponding PSFCH occupies PRBs 1 to 3.

In the second embodiment of the method shown in FIG. 3, when X resource elements are required for sending the first feedback information, and X is an integer less than N, the first terminal apparatus simply repeatedly transmits, on the feedback resource, a PSFCH that carries the first feedback information, to improve reliability of feedback information transmission. Specifically, the transmission process is described as follows.

That the first terminal apparatus sends the at least one piece of SFCI to the second terminal apparatus on the feedback resource through the at least one PSFCH includes: The first terminal apparatus sends, on the feedback resource, $$\left\lfloor \frac{N}{X} \right\rfloor$$

pieces of SFCI to the second terminal apparatus through one PSFCH.

$\lfloor \ \rfloor$ indicates rounding down. For example, if $$\frac{N}{X} = 2.5,$$

then $$\left\lfloor \frac{N}{X} \right\rfloor = 2.$$

A resource size of the PSFCH is the same as a resource size obtained after the X resource elements included in the first feedback information are repeated for $$\left\lfloor \frac{N}{X} \right\rfloor$$

times. For example, a format of the PSFCH is obtained by repeating a sequence whose size is the same as that of the X resource elements included in the first feedback information. The format of the PSFCH may alternatively be a format obtained by encoding the first feedback information, and is the same as the size of the X resource elements included in the first feedback information. In other words, the PSFCH carries $$\left\lfloor \frac{N}{X} \right\rfloor$$

pieces of SFCI, and each piece of SFCI includes the first feedback information.

That the first terminal apparatus sends, on the feedback resource, $$\left\lfloor \frac{N}{X} \right\rfloor$$

pieces of SFCI to the second terminal apparatus through one PSFCH may alternatively be replaced by that the first terminal apparatus sends, on the feedback resource, the SFCI to the second terminal apparatus through $$\left\lfloor \frac{N}{X} \right\rfloor$$

PSFCHs. The format of the PSFCH is a sequence whose size is the same as that of the X resource elements included in the first feedback information, or the format of the PSFCH may be a channel format obtained by encoding the first feedback information. The format of the PSFCH has the same size as the X resource elements included in the first feedback information. That is, each PSFCH carries one piece of SFCI, and the SFCI includes the first feedback information.

It should be noted that, in the first embodiment of the method shown in FIG. 3, that the first terminal apparatus sends $$\left\lfloor \frac{N}{X} \right\rfloor$$

pieces of SFCI to the second terminal apparatus through one PSFCH may include: The first terminal apparatus sends a maximum of $$\left\lfloor \frac{N}{X} \right\rfloor$$

pieces of SFCI and a minimum of two pieces of SFCI to the second terminal apparatus through one PSFCH. That is, a maximum of $$\left\lfloor \frac{N}{X} \right\rfloor$$

pieces of SFCI may be sent, and a minimum of two pieces of SFCI may be sent. In this way, repeated transmission of the SFCI that carries the first feedback information can be ensured.

Figures 1, 6A:
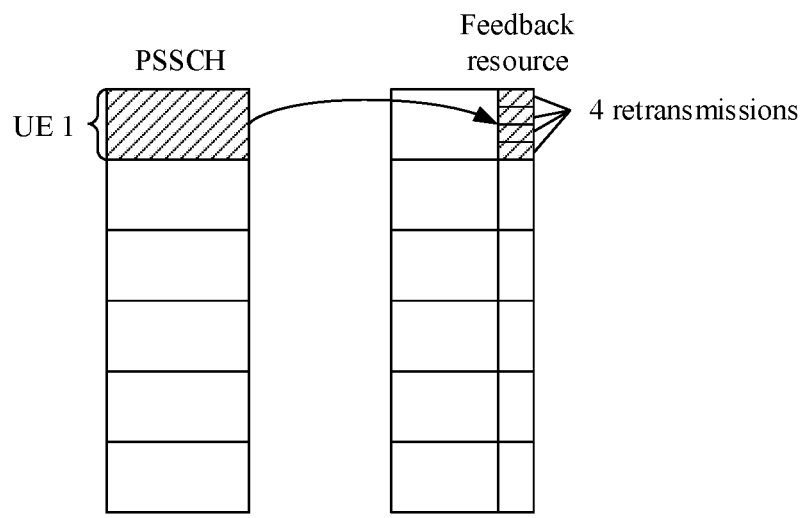
Figures 2, 6A:
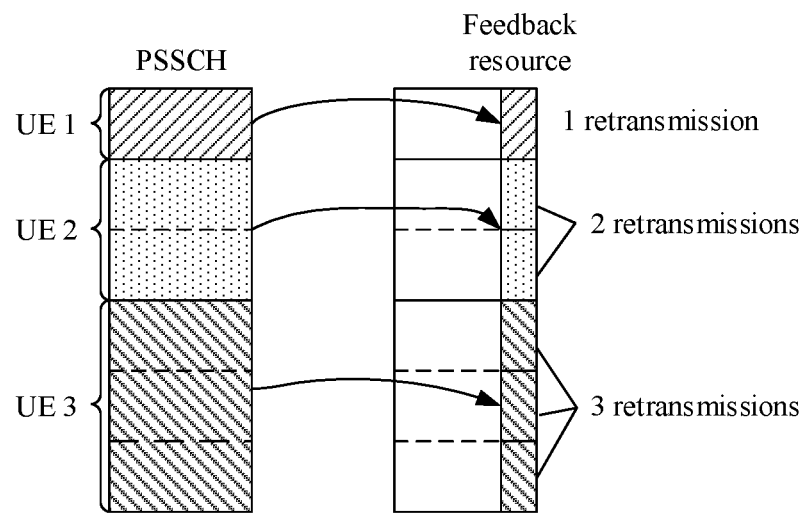

For example, in FIG. 6a-1, a PSSCH received by UE 1 and carrying sidelink data occupies one sub-channel. One sub-channel includes four PRBs, and a feedback resource determined by the UE 1 is one sub-channel corresponding to a frequency domain bandwidth of the PSSCH. When first feedback information occupies one PRB, the UE 1 may occupy four PRBs to repeatedly send feedback information to a peer end for four times.

For another example, in FIG. 6a-2, a PSSCH received by the UE 1 and carrying sidelink data occupies one sub-channel. A feedback resource determined by the UE 1 is one sub-channel corresponding to a frequency domain bandwidth of the PSSCH. When first feedback information occupies one sub-channel, the UE 1 sends feedback information to a peer end once. A PSSCH received by UE 2 and carrying sidelink data occupies two sub-channels. A feedback resource determined by the UE 2 is two sub-channels corresponding to a frequency domain bandwidth of the PSSCH. When the feedback information occupies one sub-channel, the UE 2 may occupy two sub-channels to repeatedly send the feedback information to a peer end twice. A PSSCH received by UE 3 and carrying sidelink data occupies three sub-channels. A feedback resource determined by the UE 3 is three sub-channels corresponding to a frequency domain bandwidth of the PSSCH. When the feedback information occupies one sub-channel, the UE 3 may occupy three sub-channels to repeatedly send the feedback information to a peer end for three times.

Figure 6B:
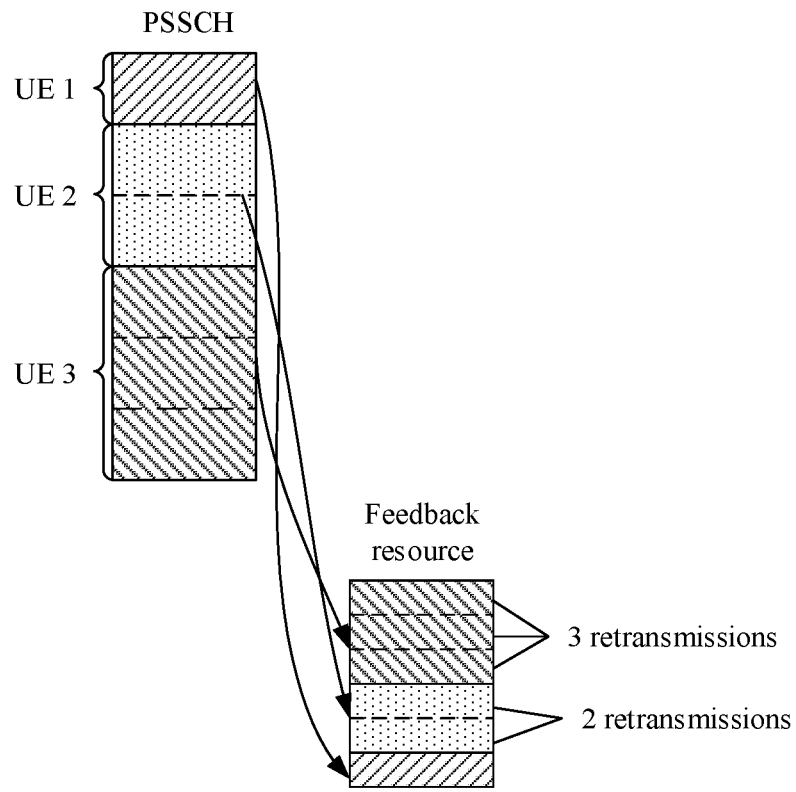
FIG. 6b is a schematic diagram of sending SFCI according to an embodiment of this application.

For another example, in FIG. 6b, a PSSCH received by UE 1 and carrying sidelink data occupies one sub-channel. A feedback resource determined by the UE 1 is one PRB corresponding to a frequency domain bandwidth of the PSSCH. When the first feedback information occupies one PRB, the UE 1 may send the first feedback information to a peer end only in the determined PRB. A PSSCH received by UE 2 and carrying sidelink data occupies two sub-channels. A feedback resource determined by the UE 2 is two PRBs corresponding to the PSSCH. When the feedback information occupies one PRB, the UE 2 may send two pieces of feedback information to a peer end only by using the determined two PRBs. A PSSCH received by UE 3 and carrying sidelink data occupies three sub-channels. A feedback resource determined by the UE 3 is three PRBs corresponding to the PSSCH. When the feedback information occupies one PRB, the UE 3 may repeatedly transmit the feedback information to a peer end for three times in the determined three PRBs.

In this way, the first terminal apparatus repeatedly sends the first feedback information to the second terminal apparatus, thereby improving robustness of the feedback information.

In the third embodiment of the method shown in FIG. 3, when X resource elements are required for sending the first feedback information, and X is an integer less than N, a length of the PSFCH that carries the first feedback information may be designed to be variable. Therefore, a frequency domain resource bandwidth occupied by the PSFCH and resource elements included in the feedback resource can be the same as much as possible. That is, the PSFCH in a variable-length design occupies all resources of the feedback resource as much as possible. This improves the reliability of feedback information transmission. Specifically, the process is as follows.

That the first terminal apparatus sends the at least one piece of SFCI to the second terminal apparatus on the feedback resource through the at least one PSFCH may include: The first terminal apparatus sends, on the feedback resource, one piece of SFCI to the second terminal apparatus through one PSFCH.

A resource size of the PSFCH is the same as a size of the N resource elements included in the feedback resource.

In an example, the format of the PSFCH is a sequence whose size is the same as that of the N resource elements included in the feedback resource. In sequence feedback, the PSFCH uses a sequence whose frequency domain length is the same as that of a corresponding PSSCH. For example, the corresponding PSSCH occupies one sub-channel that includes four PRBs, and 48 resource elements (RE) in total. In this case, the PSFCH uses a sequence with 48 sequence lengths for feedback. In encoding feedback, the PSFCH may adaptively use a frequency domain resource corresponding to a size of a corresponding PSSCH frequency domain resource, for example, may adjust a code rate to match the frequency domain resource.

In this way, the first terminal apparatus may send the first feedback information to the second terminal apparatus by using a relatively long sequence, thereby improving robustness of the feedback information.

In still another example, a format of the PSFCH may be a channel format obtained by encoding the SFCI, and has a size of N resource elements. For example, a corresponding PSSCH occupies one sub-channel that includes four PRBs, and 48 resource elements (RE) in total. In encoding feedback, the PSFCH may adaptively use a frequency domain resource corresponding to a size of a corresponding PSSCH frequency domain resource, for example, may adjust a code rate to match the frequency domain resource.

In this way, the first terminal apparatus sends the first feedback information to the second terminal apparatus at a low bit rate, thereby improving robustness of the feedback information.

In the fourth embodiment of the method shown in FIG. 3, when X resource elements are required for sending the first feedback information, and X is an integer less than N, if CSI and/or RMAI needs to be fed back to the second terminal apparatus, in addition to sending the first feedback information to the second terminal apparatus, the first terminal apparatus may further feed back the CSI and/or the RMAI to the second terminal apparatus. That is, the first feedback information and/or the CSI and/or the RMAI are uniformly encoded to generate a piece of SFCI, and the SFCI is sent to the second terminal apparatus through one PSFCH, to help the second terminal apparatus obtain available resource information, interference information, and the like that are sensed by the first terminal apparatus. This improves reliability of sending sidelink data by the second terminal apparatus based on information fed back by the first terminal apparatus. Specifically, the sending process may include the following step.

That the first terminal apparatus sends the at least one piece of SFCI to the second terminal apparatus on the feedback resource through the at least one PSFCH may include: The first terminal apparatus sends, on the feedback resource, one piece of SFCI to the second terminal apparatus through one PSFCH, where the SFCI includes the first feedback information, and further includes one or more of the CSI and the RMAI.

A resource size of the PSFCH is the same as a size of the N resource elements included in the feedback resource. For example, a format of the PSFCH is a channel format obtained by encoding the SFCI, and has a size of N resource elements. Alternatively, a format of the PSFCH is a sequence whose size is the same as that of the N resource elements included in the feedback resource.

Figure 6C:
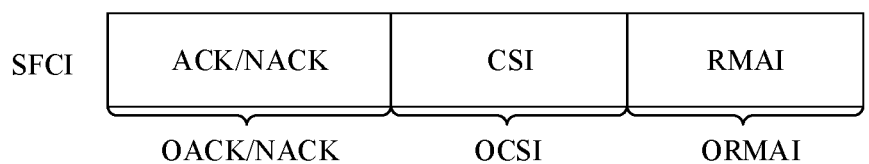
FIG. 6c is a schematic composition diagram of a type of SFCI according to an embodiment of this application.

For example, the first terminal apparatus may generate a new SFCI format shown in FIG. 6c by using the ACK/NACK, the CSI, and the RMAI. In FIG. 6c, an OACK/NACK is a quantity of information bits of an ACK/NACK when there is an ACK/NACK feedback. OCSI is a quantity of information bits of the CSI included in the SFCI when there is a channel state information feedback. ORMAI is a quantity of information bits of the RMAI included in the SFCI when there is an assistance information feedback. Subsequently, an information bit in the SFCI format is processed in a physical layer sidelink feedback control channel processing procedure to generate a PSFCH, and the first terminal apparatus may send the generated PSFCH to the second terminal apparatus on the feedback resource.

In this way, the first terminal apparatus may send channel state information, interference information, and the like that are sensed by the first terminal apparatus through measurement to the second terminal apparatus, so that the second terminal apparatus retransmits data or transmits new data based on the information fed back by the first terminal apparatus, thereby improving data transmission efficiency and reliability.

In the fifth embodiment of the method shown in FIG. 3, when X resource elements are required for sending the first feedback information, and X is an integer less than N, if CSI and/or RMAI needs to be fed back to the second terminal apparatus, a plurality of PSFCHs are designed. For example, the first terminal apparatus may generate one PSFCH by using the ACK/NACK, add the CSI and/or the RMAI together to generate another PSFCH, and simultaneously send the generated PSFCHs to the second terminal apparatus on the feedback resource. Specifically, the process is as follows.

That the first terminal apparatus sends the at least one piece of SFCI to the second terminal apparatus on the feedback resource through the at least one PSFCH includes: The first terminal apparatus sends the first SFCI to the second terminal apparatus on the feedback resource through the first PSFCH, and sends the second SFCI to the second terminal apparatus through the second PSFCH.

The first SFCI includes the first feedback information, and a resource size of the first PSFCH is the same as a size of the X resource elements included in the first feedback information. A format of the first PSFCH is a channel format obtained by encoding the first SFCI, and has a size of X resource elements. Alternatively, a format of the PSFCH is a sequence whose size is the same as that of the X resource elements included in the feedback resource. For example, the first SFCI is processed in a physical layer sidelink feedback control channel processing procedure to generate the first PSFCH.

The second SFCI includes one or more of the following information: channel state information and RMAI. A resource size of the second PSFCH is the same as a resource size obtained by subtracting the X resource elements included in the first feedback information from the N resource elements included in the feedback resource. A format of the second PSFCH is a channel format obtained by encoding the second SFCI, and has a size of N-X resource elements. Alternatively, a format of the PSFCH is a sequence whose size is the same as that of the N-X resource elements included in the feedback resource. For example, the second SFCI may be processed in a physical layer sidelink feedback control channel processing procedure to generate the second PSFCH.

Figures 1, 6D:
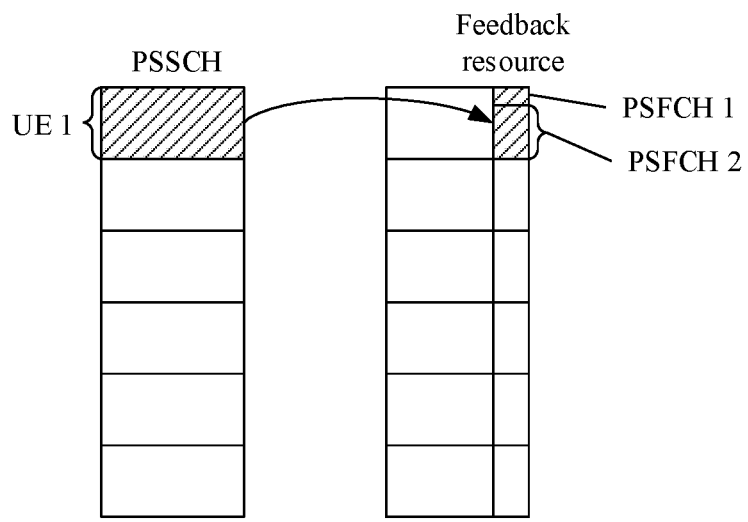
Figures 2, 6D:
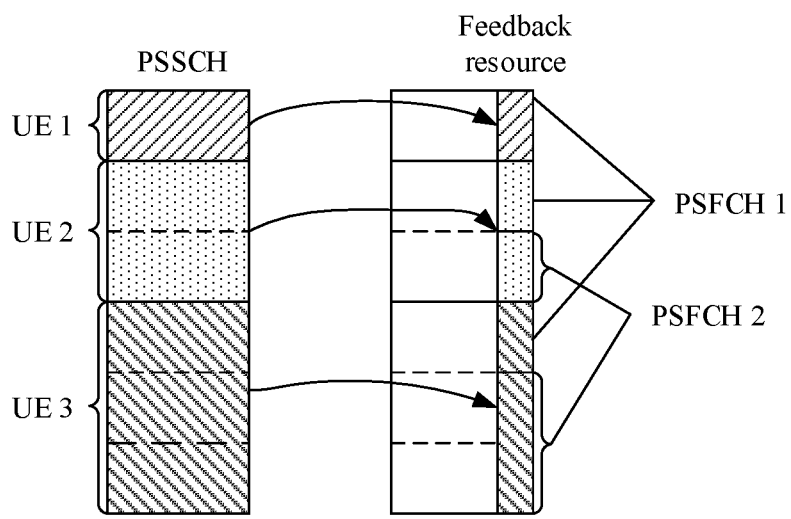

For example, it is assumed that the ACK/NACK is encoded to generate SFCI 1, and the SFCI 1 is processed in the physical layer sidelink control channel processing procedure to generate a PSFCH 1, and the PSFCH 1 occupies one PRB in frequency domain; the CSI and the RMAI are encoded to generate SFCI 2, and the SFCI 2 is processed in the physical layer sidelink control channel processing procedure to generate a PSFCH 2. As shown in FIG. 6d-1, in a short PSFCH, if a PSSCH occupied by the UE 1 to transmit sidelink data occupies one sub-channel in frequency domain, one sub-channel includes four PRBs, and the UE 1 determines, based on the PSSCH, that the feedback resource also occupies one sub-channel, the PSFCH 1 may occupy one PRB in frequency domain, and the PSFCH 2 may occupy a maximum of three remaining PRBs in frequency domain.

As shown in FIG. 6d-2, in a short PSFCH, if a PSSCH occupied by the UE 1 to transmit sidelink data occupies one sub-channel in frequency domain, the UE 1 determines, based on the PSSCH, that the feedback resource also occupies one sub-channel, and the UE 1 can support a feedback only on a PSFCH 1, the PSFCH 1 may occupy one sub-channel in frequency domain. If a PSSCH occupied by the UE 2 to transmit sidelink data occupies two sub-channels in frequency domain, the UE 2 determines, based on the PSSCH, that the feedback resource also occupies two sub-channels, and the UE 2 supports feedbacks on a PSFCH 1 and a PSFCH 2, the PSFCH 1 may occupy one sub-channel in frequency domain, and the PSFCH 2 may occupy a maximum of two remaining sub-channels in frequency domain. If a PSSCH occupied by the UE 3 to transmit sidelink data occupies three sub-channels, the UE 3 determines, based on the PSSCH, that the feedback resource also occupies three sub-channels, and the UE 3 can support feedbacks on a PSFCH 1 and a PSFCH 2, the PSFCH 1 may occupy one sub-channel in frequency domain, and two remaining sub-channels in frequency domain may be used to send the PSFCH 2.

Figure 6E:
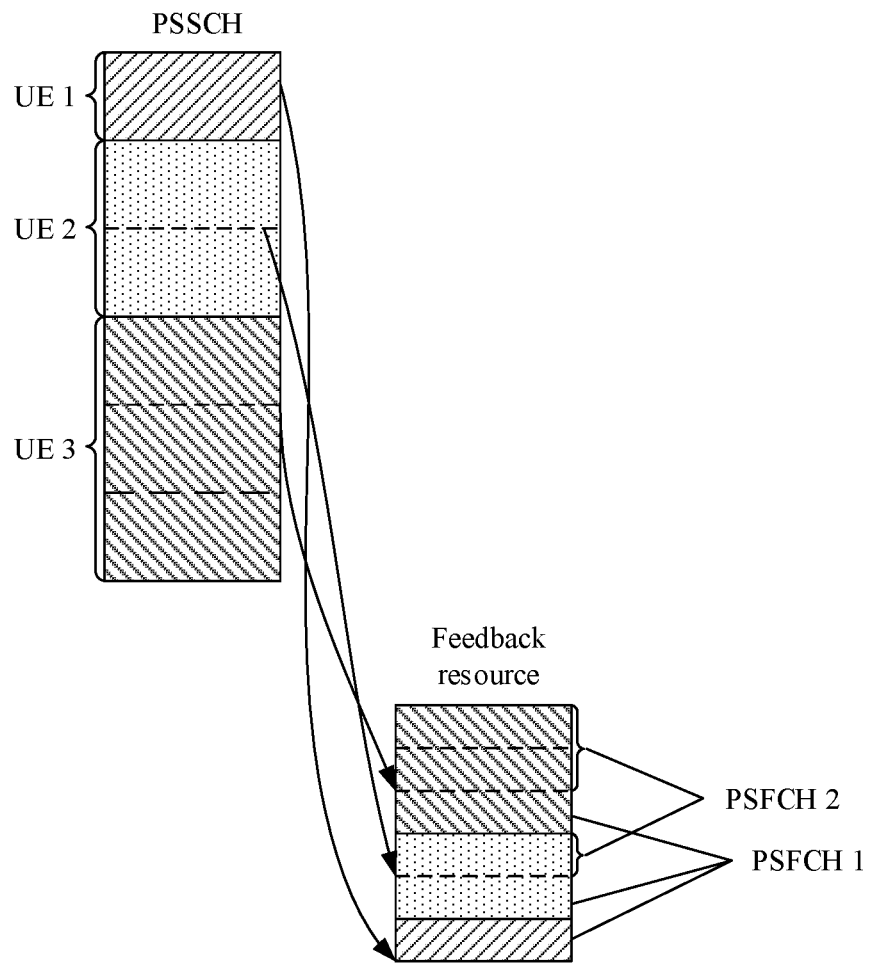
FIG. 6e is a schematic diagram of sending SFCI according to an embodiment of this application.

For another example, as shown in FIG. 6e, in a long PSFCH, if the UE 1 occupies one PRB in frequency domain, and the PSFCH 1 occupies one PRB in frequency domain, no remaining frequency domain resource can be used to transmit the PSFCH 2. The UE 2 occupies two sub-channels in frequency domain, and the PSFCH 1 occupies one PRB in frequency domain. In this case, one remaining PRB in frequency domain may be used to transmit the PSFCH 2. The UE 3 occupies three sub-channels in frequency domain, and the PSFCH 1 occupies one PRB in frequency domain. In this case, two remaining PRBs in frequency domain may be used to transmit the PSFCH 2.

In this way, the first terminal apparatus may not only send, to the second terminal apparatus, a PSFCH carrying the first feedback information, but also send, to the second terminal apparatus, another PSFCH carrying additional information. Therefore, reliability of the ACK/NACK feedback is ensured, and the remaining feedback resource is effectively used to feed back channel information, available resource information, interference information, and the like that are sensed by the first terminal apparatus through measurement. The second terminal apparatus retransmits data or transmits new data based on the information fed back by the first terminal apparatus, thereby improving data transmission efficiency and reliability.

The foregoing mainly describes the solutions provided in the embodiments of this application from a perspective of the first terminal apparatus. It may be understood that, to implement the foregoing functions, each node, for example, the first terminal apparatus, includes a corresponding hardware structure and/or a software module for performing each function. A person skilled in the art should easily be aware that, in combination with algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional modules of the access network device and the terminal may be obtained through division based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely a logical function division. In an actual implementation, another division manner may be used.

Figure 7:
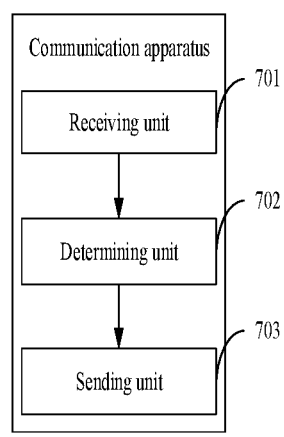
FIG. 7 is a schematic composition diagram of a communication apparatus 70 according to an embodiment of this application.

FIG. 7 is a diagram of a structure of a communication apparatus 70. The communication apparatus 70 may be a first terminal apparatus or a chip or a system-on-a-chip in the first terminal apparatus, and the communication apparatus 70 may be configured to perform functions of the first terminal apparatus in the foregoing embodiments. In an implementation, the communication apparatus 70 shown in FIG. 7 includes a receiving unit 701, a determining unit 702, and a sending unit 703.

The receiving unit 701 is configured to receive first sidelink data from a second terminal apparatus. For example, the receiving unit 701 can support the communication apparatus 70 in performing step 302.

The determining unit 702 is configured to determine, based on a transmission resource of the first sidelink data, a feedback resource used to send SFCI. The transmission resource of the first sidelink data and the feedback resource include the same quantity of resource elements, for example, N resource elements, and N is a positive integer. For example, the determining unit 702 can support the communication apparatus 70 in performing step 303.

The sending unit 703 is configured to: when X resource elements are required for sending first feedback information, and X is less than N, used by the first terminal apparatus, send at least one piece of SFCI to the second terminal apparatus on the feedback resource through at least one PSFCH, where the SFCI includes the first feedback information, and the first feedback information is used to indicate whether the first terminal apparatus correctly receives the first sidelink data. For example, the sending unit 703 can support the communication apparatus 70 in performing step 304.

Specifically, all related content of the steps in the method embodiment shown in FIG. 3 may be cited to function descriptions of corresponding functional modules. Details are not described again. The communication apparatus 70 is configured to perform functions of the first terminal apparatus in the PSFCH sending method shown in FIG. 3, and therefore can achieve the same effect as the foregoing PSFCH sending method.

In still another implementation, the communication apparatus 70 shown in FIG. 7 includes a processing module and a communication module. The processing module is configured to control and manage an action of the communication apparatus 70. For example, the processing module may integrate a function of the determining unit 702, and may be configured to support the communication apparatus 70 in performing step 303 and another process of the technology described in this specification. The communication module may integrate functions of the receiving unit 701 and the sending unit 703, and may be configured to support the communication apparatus 70 in performing step 302 and step 304, and communicating with another network entity, for example, communicating with a functional module or a network entity shown in FIG. 1a. The communication apparatus 70 may further include a storage module, to store program code and data of the communication apparatus 70.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communication module may be a transceiver circuit, a communication interface, or the like. The storage module may be a memory. When the processing module is a processor, the communication module is a communication interface, and the storage module is a memory, the communication apparatus 70 in this embodiment of this application may be the communication apparatus shown in FIG. 2.

Figure 8:
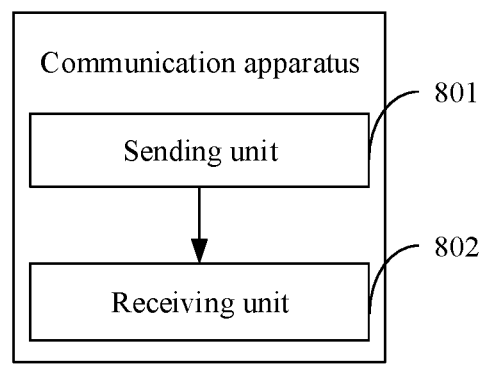
FIG. 8 is a schematic composition diagram of a communication apparatus 80 according to an embodiment of this application.

FIG. 8 is a diagram of a structure of a communication apparatus 80. The communication apparatus 80 may be a second terminal apparatus or a chip or a system-on-a-chip in the second terminal apparatus, and the communication apparatus 80 may be configured to perform functions of the second terminal apparatus in the foregoing embodiments. In an implementation, the communication apparatus 80 shown in FIG. 8 includes a sending unit 801 and a receiving unit 802.

The sending unit 801 is configured to send first sidelink data to a first terminal apparatus. A transmission resource of the first sidelink data includes N resource elements. For example, the sending unit 801 can support the communication apparatus 80 in performing step 301.

The receiving unit 802 is configured to receive at least one piece of SFCI from the first terminal apparatus through at least one PSFCH. First feedback information is used to indicate whether the first terminal apparatus correctly receives the first sidelink data. X resource elements are required for sending the first feedback information, and X is less than N. For example, the receiving unit 802 can support the communication apparatus 80 in performing step 305.

Specifically, all related content of the steps in the method embodiment shown in FIG. 8 may be cited to function descriptions of corresponding functional modules. Details are not described herein again. In still another possible design, the communication apparatus 80 is configured to perform functions of the second terminal apparatus in the PSFCH sending method shown in FIG. 3, and therefore can achieve the same effect as the foregoing PSFCH sending method.

In still another implementation, the communication apparatus 80 shown in FIG. 8 includes a processing module and a communication module. The processing module is configured to control and manage an action of the communication apparatus 80. For example, the processing module may be configured to support the communication apparatus 80 in performing another process of the technology described in this specification. The communication module may integrate functions of the sending unit 801 and the receiving unit 802, and may be configured to support the communication apparatus 80 in performing step 301 and step 305, and communicating with another network entity, for example, communicating with a functional module or a network entity shown in FIG. 7a. The communication apparatus 80 may further include a storage module, to store program code and data of the communication apparatus 80.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communication module may be a transceiver circuit, a communication interface, or the like. The storage module may be a memory. When the processing module is a processor, the communication module is a communication interface, and the storage module is a memory, the communication apparatus 80 in this embodiment of this application may be the communication apparatus shown in FIG. 2.

Figure 9:
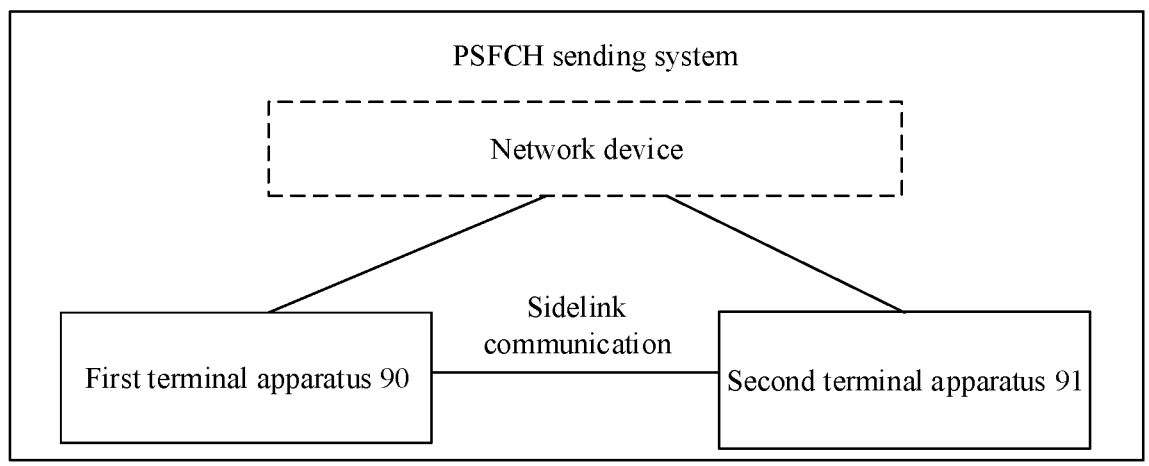
FIG. 9 is a schematic composition diagram of a PSFCH sending system according to an embodiment of this application.

FIG. 9 is a diagram of a structure of a PSFCH sending system according to an embodiment of this application. As shown in FIG. 9, the system may include a first terminal apparatus 90 and a second terminal apparatus 91, and may further include a network device.

The first terminal apparatus 90 has functions of the communication apparatus 70 shown in FIG. 7. The second terminal apparatus 91 has functions of the communication apparatus 70 shown in FIG. 8.

For example, the second terminal apparatus 91 is configured to send first sidelink data to the first terminal apparatus 90.

The first terminal apparatus 90 is configured to: receive the first sidelink data from the second terminal apparatus 91, and determine, based on a transmission resource of the first sidelink data, a feedback resource used to send SFCI. The transmission resource of the first sidelink data and the feedback resource include the same quantity of resource elements, for example, N resource elements, and N is a positive integer.

The first terminal apparatus 90 is configured to: when X resource elements are required for sending first feedback information, and X is less than N, send at least one piece of SFCI to the second terminal apparatus 91 on the feedback resource through at least one PSFCH, where the SFCI includes the first feedback information, and the first feedback information is used to indicate whether the first terminal apparatus 90 correctly receives the first sidelink data.

The second terminal apparatus 91 is further configured to receive, on the feedback resource through the at least one PSFCH, the at least one piece of SFCI sent by the first terminal apparatus 90.

Specifically, in this possible design, for a specific implementation process of the first terminal apparatus 90, refer to the execution process of the first terminal apparatus in the method embodiment in FIG. 3. For a specific implementation process of the second terminal apparatus 91, refer to the execution process of the second terminal apparatus in the method embodiment in FIG. 3.

Based on the system shown in FIG. 9, the first terminal apparatus 90 may determine, based on a transmission resource of sidelink data, a feedback resource used to transmit feedback information. When the feedback resource is greater than a resource required for sending the feedback information, at least one piece of SFCI including the first feedback information is sent to the second terminal apparatus 91 through at least one PSFCH. In this way, not only the feedback resource is determined, but also how to send the SFCI on the determined feedback resource is specified.

An embodiment of this application further provides a computer-readable storage medium. All or some of the procedures of the method embodiments may be implemented by a computer program instructing related hardware. The program may be stored in the computer-readable storage medium. When the program is executed, the procedures of the method embodiments may be performed. The computer-readable storage medium may be an internal storage unit of the terminal apparatus (including a data transmit end and/or a data receive end) in any one of the foregoing embodiments, for example, a hard disk or a memory of the terminal apparatus. Alternatively, the computer-readable storage medium may be an external storage device of the terminal apparatus, for example, a plug-in hard disk, a smart media card (SMC), a secure digital (SD) card, a flash card, or the like that are configured on the terminal apparatus. Further, the computer-readable storage medium may include both an internal storage unit and an external storage device of the terminal apparatus. The computer-readable storage medium is configured to store the computer program and other programs and data that are required by the terminal apparatus. The computer-readable storage medium may be further configured to temporarily store data that has been output or is to be output.

It should be noted that the terms "first", "second", and the like in the specification, claims, and accompanying drawings of this application are intended to distinguish between different objects, rather than to indicate a particular order. In addition, the terms "including", "having", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that in this application, "at least one (item)" means one or more, "a plurality of" means two or more, and "at least two (items)" means two, three or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof means any combination of the items, including any combination of one item (piece) or a plurality of items (pieces). For example, at least one (piece) of a, b, or c may represent: a, b, c, "a and b", "a and c", "b and c", or "a, b, and c", where a, b, and c may be singular or plural.

Based on the foregoing descriptions of the implementations, a person skilled in the art may clearly understand that for the purpose of convenient and brief descriptions, division into the foregoing functional modules is merely used as an example for description. During actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A physical sidelink feedback channel (PSFCH) sending method, wherein the method comprises:
   receiving, by a first terminal apparatus, first sidelink data from a second terminal apparatus,
   wherein a transmission resource of the first sidelink data comprises N resource elements, and N is a positive integer;
   determining, by the first terminal apparatus, a feedback resource based on the transmission resource of the first sidelink data,
   wherein the feedback resource is used to transmit sidelink feedback control information (SFCI), and the feedback resource comprises N resource elements; and
   sending, by the first terminal apparatus, a first SFCI to the second terminal apparatus on the feedback resource through a first PSFCH and sending second SFCI to the second terminal apparatus through a second PSFCH,
   wherein X resource elements are required for sending feedback information, and X is less than N,
   wherein the first SFCI comprises the feedback information,
   wherein the feedback information indicates whether the first terminal apparatus correctly receives the first sidelink data,
   wherein the second SFCI comprises one or more of channel state information and receiving terminal measured assistance information (RMAI),
   wherein a resource size of the first PSFCH is the same as a size of the X resource elements in the feedback information, and
   wherein a resource size of the second PSFCH is the same as a resource size obtained by subtracting the X resource elements in the feedback information from the N resource elements in the feedback resource.

2. The method according to claim 1, wherein the first sidelink data occupies an $n^{th}$ slot, wherein n is a natural number and the feedback resource is not earlier than an $(n+k)^{th}$ slot, wherein k is a natural number.

3. The method according to claim 2, further comprising:
   receiving, by the first terminal apparatus, indication information configured by a network device, or obtaining, by the first terminal apparatus, preconfigured indication information, or receiving, by the first terminal apparatus, indication information sent by the second terminal apparatus, wherein the indication information indicates a value of k; and
   wherein determining the feedback resource comprises: determining, by the first terminal apparatus based on the indication information, a time domain resource comprised in the feedback resource.

4. The method according to claim 1, wherein a frequency domain start location of the feedback resource is the same as a start location of a frequency domain resource occupied by the first sidelink data.

5. A physical sidelink feedback channel (PSFCH) sending method comprising:
   sending, by a second terminal apparatus, first sidelink data to a first terminal apparatus,
   wherein a transmission resource of the first sidelink data comprises N resource elements, and N is a positive integer; and
   receiving, by the second terminal apparatus on a feedback resource used to transmit sidelink feedback control information (SFCI), first SFCI from the first terminal apparatus through a first PSFCH, and receiving second SFCI from the first terminal apparatus through a second PSFCH,
   wherein the SFCI comprises feedback information that indicates whether the first terminal apparatus correctly receives the first sidelink data,
   wherein the feedback resource comprises N resource elements,
   wherein X resource elements are required for sending the feedback information, and X is less than N,
   wherein a resource size of the first PSFCH is the same as a size of the X resource elements in the feedback information,
   wherein a resource size of the second PSFCH is the same as a resource size obtained by subtracting the X resource elements in the feedback information from the N resource elements in the feedback resource,
   wherein the first SFCI comprises the feedback information, and
   wherein the second SFCI comprises one or more of channel state information and receiving terminal measured assistance information (RMAI).

6. The method according to claim 5, wherein the first sidelink data occupies an $n^{th}$ slot, wherein n is a natural number and the feedback resource is not earlier than an $(n+k)^{th}$ slot, wherein k is a natural number.

7. The method according to claim 6, wherein k is configured by a network device for the first terminal apparatus: or k is preconfigured on the first terminal apparatus: or k is indicated by the second terminal apparatus to the first terminal apparatus.

8. The method according to claim 5, wherein a frequency domain start location of the feedback resource is the same as a start location of a frequency domain resource occupied by the first sidelink data.

9. A terminal apparatus comprising:
a receiver configured to cooperate with a processor to receive first sidelink data from a second terminal apparatus,
wherein a transmission resource of the first sidelink data comprises N resource elements, and N is a positive integer:
the processor configured to determine a feedback resource based on the transmission resource of the first sidelink data,
wherein the feedback resource is used to transmit sidelink feedback control information (SFCI), and the feedback resource comprises N resource elements; and
a transmitter configured to cooperate with the processor to send a first SFCI to the second terminal apparatus on the feedback resource through a first physical sidelink feedback channel (PSFCH), and sending second SFCI to the second terminal apparatus through a second PSFCH,
wherein X resource elements are required for sending feedback information, and X is less than N,
wherein the first SFCI comprises the feedback information, and
wherein the feedback information indicates whether the receiver correctly receives the first sidelink data,
wherein the second SFCI comprises one or more of channel state information and receiving terminal measured assistance information (RMAI),
wherein a resource size of the first PSFCH is the same as a size of the X resource elements in the feedback information, and
wherein a resource size of the second PSFCH is the same as a resource size obtained by subtracting the X resource elements in the feedback information from the N resource elements in the feedback resource.

10. The method according to claim 6 further comprising:
sending, by the second terminal apparatus, indication information to the first terminal apparatus, wherein the indication information indicates a value of k; and
wherein the feedback resource is a time domain resource determined by the indication information.

11. The apparatus according to claim 9, wherein the first sidelink data occupies an $n^{th}$ slot, wherein n is a natural number and the feedback resource is not earlier than an $(n+k)^{th}$ slot, wherein k is a natural number.

12. The apparatus according to claim 11, wherein the receiver is further configured to:
receive indication information configured by a network device, wherein the indication information indicates a value of k; and
the processor is further configured to determine, based on the indication information, a time domain resource comprised in the feedback resource.

13. The apparatus according to claim 11, wherein the receiver is further configured to obtain indication information that indicates a value of k; and the processor is further configured to determine, based on the indication information, a time domain resource comprised in the feedback resource.

14. The apparatus according to claim 13, wherein the obtained indication information is obtained from the second terminal apparatus.

15. The apparatus according to claim 9, wherein a frequency domain start location of the feedback resource is the same as a start location of a frequency domain resource occupied by the first sidelink data.

16. The method according to claim 2, wherein k is configured by a network device for the apparatus.

17. The apparatus according to claim 10, wherein k is preconfigured on the apparatus.

18. The apparatus according to claim 10, wherein k is indicated by a terminal apparatus to the apparatus.

* * * * *